(12) United States Patent  
Yin et al.

(10) Patent No.: US 10,739,927 B2  
(45) Date of Patent: Aug. 11, 2020

(54) OPERATION DETECTION METHOD AND APPARATUS, AND MOBILE TERMINAL

(71) Applicant: Huawei Technologies Co., Ltd., Shenzhen (CN)

(72) Inventors: Bangshi Yin, Beijing (CN); Jiuliang Gao, Beijing (CN); Kangle Xue, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/340,945

(22) PCT Filed: Oct. 11, 2016

(86) PCT No.: PCT/CN2016/101811  
§ 371 (c)(1),  
(2) Date: Apr. 10, 2019

(87) PCT Pub. No.: WO2018/068207  
PCT Pub. Date: Apr. 19, 2018

(65) Prior Publication Data  
US 2019/0235703 A1   Aug. 1, 2019

(51) Int. Cl.  
*G06F 3/045* (2006.01)  
*G06F 3/044* (2006.01)  
(Continued)

(52) U.S. Cl.  
CPC ............ *G06F 3/0447* (2019.05); *G06F 1/169* (2013.01); *G06F 1/1626* (2013.01);  
(Continued)

(58) Field of Classification Search  
CPC .......... G06F 3/01; G06F 3/017; G06F 3/0346; G06F 3/041; G06F 3/0416; G06F 3/0418;  
(Continued)

(56) References Cited

U.S. PATENT DOCUMENTS

| 9,898,161 B2 * | 2/2018 | Han | G06F 3/0488 |
| 2008/0165141 A1 * | 7/2008 | Christie | G06F 3/0488 |
|  |  |  | 345/173 |

(Continued)

FOREIGN PATENT DOCUMENTS

| CN | 102122229 A | 7/2011 |
| CN | 102122230 A | 7/2011 |

(Continued)

OTHER PUBLICATIONS

Machine Translation and Abstract of Chinese Publication No. CN104915143, Sep. 16, 2015, 28 pages.

(Continued)

*Primary Examiner* — Joe H Cheng  
(74) *Attorney, Agent, or Firm* — Conley Rose, P.C.

(57) ABSTRACT

An operation detection method and apparatus, and a mobile terminal, where the method includes determining a contact region of a hand of a user on a side face of a mobile terminal and a dynamic change of the hand of the user using electrical characteristics of two capacitive touch display screens of the mobile terminal based on detected capacitance signals on the two capacitive touch display screens, determining a gesture operation of the hand on the side face, improving sensitivity of identifying a gesture on the side face, and accurately identifying the gesture operation of the hand of the user on the side face.

20 Claims, 17 Drawing Sheets

(51) Int. Cl.
  *G06F 3/01* (2006.01)
  *G06F 3/041* (2006.01)
  *G06F 3/0488* (2013.01)
  *G06F 1/16* (2006.01)

(52) U.S. Cl.
  CPC ............ *G06F 1/1692* (2013.01); *G06F 3/017* (2013.01); *G06F 3/0416* (2013.01); *G06F 3/0488* (2013.01); *G06F 3/04883* (2013.01); *G06F 3/044* (2013.01); *G06F 2203/0339* (2013.01); *G06F 2203/04808* (2013.01)

(58) Field of Classification Search
  CPC ...... G06F 3/044; G06F 3/0447; G06F 3/0488; G06F 3/04883; G06F 1/169; G06F 1/1692; G06F 1/32; G06F 2203/0339; G06F 2203/04808; G02F 1/1333; G02F 1/133308; G02F 1/13338
  See application file for complete search history.

(56) References Cited

U.S. PATENT DOCUMENTS

| | | | |
|---|---|---|---|
| 2009/0174679 A1* | 7/2009 | Westerman | G06F 3/0416 345/173 |
| 2010/0107067 A1* | 4/2010 | Vaisanen | G06F 3/0486 715/702 |
| 2010/0110019 A1* | 5/2010 | Ozias | G06F 3/03547 345/173 |
| 2010/0173679 A1* | 7/2010 | Moon | H04M 1/67 455/566 |
| 2010/0188428 A1* | 7/2010 | Shin | G06F 1/1639 345/661 |
| 2010/0302172 A1* | 12/2010 | Wilairat | G06F 3/04883 345/173 |
| 2011/0205163 A1* | 8/2011 | Hinckley | G06F 3/0483 345/173 |
| 2011/0209097 A1 | 8/2011 | Hinckley et al. | |
| 2011/0209098 A1 | 8/2011 | Hinckley et al. | |
| 2012/0098766 A1* | 4/2012 | Dippel | G06F 3/04883 345/173 |
| 2013/0082978 A1* | 4/2013 | Horvitz | G06F 3/017 345/175 |
| 2014/0320420 A1 | 10/2014 | Ida et al. | |
| 2015/0185265 A1 | 7/2015 | McCarthy et al. | |
| 2016/0259521 A1 | 9/2016 | Tokutake | |
| 2017/0192291 A1 | 7/2017 | Shi | |
| 2017/0371454 A1* | 12/2017 | Kitada | G06F 3/044 |
| 2018/0225021 A1 | 8/2018 | Hinckley et al. | |
| 2018/0364865 A1 | 12/2018 | Li et al. | |

FOREIGN PATENT DOCUMENTS

| | | |
|---|---|---|
| CN | 102662463 A | 9/2012 |
| CN | 102754050 A | 10/2012 |
| CN | 104375724 A | 2/2015 |
| CN | 104915143 | 9/2015 |
| CN | 105093624 A | 11/2015 |
| CN | 105278841 A | 1/2016 |
| CN | 105511675 A | 4/2016 |
| CN | 105868607 A | 8/2016 |
| CN | 105956432 A | 9/2016 |
| WO | 2016154859 A1 | 10/2016 |

OTHER PUBLICATIONS

Machine Translation and Abstract of Chinese Publication No. CN102662463, Sep. 12, 2012, 11 pages.
Machine Translation and Abstract of Chinese Publication No. CN104375724, Feb. 25, 2015, 20 pages.
Machine Translation and Abstract of Chinese Publication No. CN105868607, Aug. 17, 2016, 18 pages.
Foreign Communication From a Counterpart Application, PCT Application No. PCT/CN2016/101811, English Translation of International Search Report dated Jul. 3, 2017, 2 pages.
Foreign Communication From a Counterpart Application, PCT Application No. PCT/CN2016/101811, English Translation of Written Opinion dated Jul. 3, 2017, 5 pages.
Machine Translation and Abstract of Chinese Publication No. CN105278841, Jan. 27, 2016, 31 pages.
Machine Translation and Abstract of Chinese Publication No. CN105956432, Sep. 21, 2016, 32 pages.
Machine Translation and Abstract of International Publication No. WO2016154859, Oct. 6, 2016, 26 pages.
Foreign Communication From a Counterpart Application, Chinese Application No. 201680090039.4, Chinese Office Action dated Jan. 3, 2020, 5 pages.

* cited by examiner

OPERATION DETECTION METHOD AND APPARATUS, AND MOBILE TERMINAL

CROSS-REFERENCE TO RELATED APPLICATIONS

This application is a U.S. National Stage of International Patent Application No. PCT/CN2016/101811, filed on Oct. 11, 2016, which is hereby incorporated by reference in its entirety.

TECHNICAL FIELD

The present invention relates to the field of electronic technologies, and in particular, to an operation detection method and apparatus, and a mobile terminal.

BACKGROUND

Currently, for a mobile phone that is widely used among mobile terminals, touchscreen on a front face of the mobile phone is a main touch input method. Touchscreens commonly include a resistive touch display screen and a capacitive touch display screen.

The capacitive touch display screen gradually replaces the resistive touch display screen and becomes a mainstream because of high sensitivity of the capacitive touch display screen.

In an existing touch technology solution relating to a capacitive screen, capacitive sensors formed by ITO (indium tin oxide) transparent conductive films are arranged on a capacitive touchscreen. A position and movement of a finger on the touchscreen are sensed by using the capacitive sensors, so as to determine a touch instruction of a user.

During actual use, when holding a mobile phone, a user usually comes into contact with a side face of the mobile phone. In the prior art, because a mobile phone has low touch sensitivity to and a relatively serious operation limitation on a side face, an operation performed by a hand of a user on the side face cannot be accurately identified. Currently, there are usually physical keys (such as a volume key and a lock screen key) on a side face of a mobile phone. An operation performed by a user on the side face of the mobile phone is only a pressing operation on a physical key, leading to undiversified operations and poor user experience.

SUMMARY

In view of the above, a method and a device provided in the present invention are used to resolve a problem in the prior art that an operation performed by a hand of a user on a side face of a mobile terminal cannot be accurately identified.

According to an aspect, some embodiments of this application provide an operation detection method for a mobile terminal. The operation detection method includes: first, detecting capacitance signals on a first capacitive touch display screen and a second capacitive touch display screen, where the first capacitive touch display screen is located on a front face of the mobile terminal, and the second capacitive touch display screen is located on a back face of the mobile terminal; then, determining at least one first region in which the capacitance signal on the first capacitive touch display screen meets a capacitance change threshold range, and determining at least one second region in which the capacitance signal on the second capacitive touch display screen meets the capacitance change threshold range; next, in response to a detected third region and fourth region that are approaching a same side face and that are opposite to each other in a first direction, determining a side region between each pair of a third region and a fourth region that are opposite to each other as a contact region of a hand of a user and the side face, where each third region is all or a part of the first region, each fourth region is all or a part of the fourth region, and the first direction is perpendicular to the front face of the mobile terminal; and subsequently, and further in real time, in response to detected region changes of the third region and the fourth region that are opposite to each other in the first direction, determining a dynamic change of the hand of the user in the contact region on the side face, and determining a gesture operation of the hand of the user on the side face based on the dynamic change of the hand of the user in the contact region on the side face, where the region changes include any pair of region area changes, region capacitance signal strength changes, and region position changes.

According to the foregoing embodiments, in the operation detection method, the contact region of the hand of the user on the side face of the mobile terminal and the dynamic change of the hand of the user are determined by using electrical characteristics of the two capacitive touch display screens of the mobile terminal based on the detected capacitance signals on the two capacitive touch display screens, and the gesture operation of the hand on the side face is determined, improving sensitivity of identifying a gesture on the side face, and accurately identifying the gesture operation of the hand of the user on the side face. In addition, the dynamic change of the hand of the user in the contact region on the side face may be determined based on changes of the capacitance signals on the two capacitive touch display screens of the mobile terminal, and the gesture operation, including longitudinal sliding (sliding from top to bottom on the side face), vertical sliding (sliding from the front face to the back face or from the back face to the front face on the side face), a tap, or another gesture operation, of the hand of the user on the side face may be further determined, increasing diversity of an identifiable operation, having better operation flexibility compared with a physical key disposed on a side face of a mobile terminal in the prior art, and improving user experience. In some embodiments, the operation detection method may replace a method in which the physical key is used to identify a gesture operation of a user on the side face, reducing an operation constraint caused by an unchangeable physical position of a physical key, improving usability, and increasing entertainment value of an operation. In addition, a physical key may be no longer disposed on the side face of the mobile terminal, thereby helping improve smoothness and aesthetics of an appearance of the mobile terminal.

In some embodiments, the step of determining a contact region of a hand of a user and the side face includes: in response to detecting that a relative area of the third region and the fourth region that are opposite to each other in the first direction meets a preset area threshold or that an area ratio meets a preset area ratio threshold, determining the side region between the third region and the fourth region as the contact region of the hand of the user and the side face.

In some embodiments, the step of determining a contact region of a hand of a user and the side face further includes: determining, based on relative positions of the third region and the fourth region that are opposite to each other in the first direction, that a center of a contact position of the hand of the user on the side face is at a first position in a second direction on the side face; and determining, based on an area relationship between the third region and the fourth region that are opposite to each other in the first direction, that the center of the contact position of the hand of the user on the side face is at a second position in the first direction on the side face. The step of determining a gesture operation of the hand of the user on the side face further includes: in response to detecting position changes of the first position and the second position on the side face over time, determining the gesture operation of the hand of the user on the side face.

In some embodiments, the step of determining a gesture operation of the hand of the user on the side face may be specifically used to determine at least one or more of the following operations:

A sliding operation in the first direction on the side face: In response to detecting that for the third region and the fourth region that are opposite to each other in the first direction, a region area of the third region gradually increases and a region area of the fourth region gradually decreases over time, or a region area of the third region gradually decreases and a region area of the fourth region gradually increases over time, movement of the hand of the user in the first direction in the contact region on the side face is determined. A sliding operation of the hand of the user in the first direction on the side face is determined based on the movement of the hand of the user in the first direction in the contact region on the side face.

A sliding operation in the first direction on the side face: In response to detecting that for the third region and the fourth region that are opposite to each other in the first direction, a region capacitance signal in the third region gradually increases and a region capacitance signal in the fourth region gradually decreases over time, or a region capacitance signal in the third region gradually decreases and a region capacitance signal in the fourth region gradually increases over time, movement of the hand of the user in the first direction in the contact region on the side face is determined. A sliding operation of the hand of the user in the first direction on the side face is determined based on the movement of the hand of the user in the first direction in the contact region on the side face.

A sliding operation in the second direction on the side face: in response to detecting a relative position movement, in a second direction over time, of the third region and the fourth region that are opposite to each other in the first direction, movement of the hand of the user in the second direction in the contact region on the side face is determined. The second direction is parallel to the front face and the side face of the mobile terminal. A sliding operation of the hand of the user in the second direction on the side face is determined based on the movement of the hand of the user in the second direction in the contact region on the side face.

A tap operation on the side face: In response to detecting that the third region and the fourth region that are opposite to each other in the first direction appear and then simultaneously disappear within a first time threshold, it is determined that the hand of the user comes into contact with and then leaves the contact region on the side face within the first time threshold. A tap operation of the hand of the user on the side face is determined based on that the hand of the user comes into contact with and then leaves the contact region on the side face within the first time threshold.

In some embodiments, the step of determining a contact region of a hand of a user and the side face includes: determining a plurality of side regions as a plurality of contact regions of the hand of the user and the side face. The step of determining a gesture operation of the hand of the user on the side face includes: in response to detecting dynamic changes of the hand of the user in the plurality of contact regions on the side face, determining a multipoint gesture operation of the hand of the user on the side face.

In some embodiments, with reference to the foregoing embodiments, the method further includes: detecting an application program that is currently being run; in response to detecting the gesture operation of the hand of the user on the side face, associating the gesture operation with the application program, and determining an operation instruction; and executing the operation instruction.

According to the foregoing embodiments, in the operation detection method, the gesture operation of the hand of the user on the side face is further associated with the application program to determine the operation instruction, increasing diversity of an operation of the user.

In some embodiments, the step of determining an operation instruction includes: detecting a first gesture enabling operation, where the first gesture enabling operation includes a preset gesture enabling operation of the hand of the user on the side face; and in response to detecting the first gesture enabling operation, enabling association identification for associating the gesture operation with the application program, and in response to detecting the gesture operation of the hand of the user on the side face, associating the gesture operation with the application program, and determining the operation instruction.

In some embodiments, the step of determining an operation instruction includes: after the association identification is enabled, disabling the association identification if no gesture operation of the hand of the user on the side face is detected within a preset time period.

In some embodiments, in the method, for a system or different applications, when different operation meanings (such as volume up/down, song switching, and page turning of an e-book) are assigned to different motions of a gesture operation, a current application program of the system or the different application is detected, and the gesture operation is associated with the application program. After the association is implemented, a correct gesture operation plays a part and generates a corresponding operation instruction. The mobile terminal executes the gesture operation instruction.

In some embodiments, based on the foregoing embodiments, the operation detection method further includes: performing gesture pattern identification on a combination of the first region and the second region, to determine a holding posture of the hand of the user. The holding posture of the hand of the user includes the left hand or the right hand for holding, and contact positions of a palm and fingers on the mobile terminal.

According to the foregoing embodiments, the holding posture of the hand of the user is determined, where the holding posture of the hand of the user includes the left hand or the right hand for holding, and contact positions of a palm and fingers on the mobile terminal, so as to determine a valid gesture operation based on the holding posture, avoid interference of an unintended contact in operation detection, and further improve operation detection accuracy. In addition, a multipoint gesture operation of a finger on the side face of the mobile terminal may be identified based on the holding posture, thereby improving diversity and flexibility of a gesture.

In some embodiments, in combination with the determining a holding posture of the hand of the user, the operation detection method further includes: determining, based on the holding posture of the hand of the user, a display screen currently being viewed by the user, where the display screen is the first capacitive touch display screen or the second capacitive display screen; and displaying information on the display screen being viewed by the user, so as to reduce energy consumption of the mobile terminal.

In some embodiments, for the mobile terminal using the operation detection method described in the foregoing embodiments, physical keys such as a volume key and a lock screen key disposed on a side face of a mobile terminal in the prior art may be canceled, thereby eliminating a side opening and improving a waterproof capability of an entire mobile phone.

Further, the first capacitive touch display screen and the second capacitive touch display screen include capacitive sensors formed by mutual-capacitance sensors.

It should be noted that the contact region of the hand of a user and the side face includes: a contact touch region of the hand of the user and the side face; and/or a floating touch region of the hand of the user and the side face.

According to an aspect, some embodiments of this application provide a mobile terminal. The mobile terminal includes a touch display unit, one or more processors, a memory, and a plurality of application programs. The memory is configured to store a computer program. The processor is configured to run the computer program, to perform the following procedures: detecting capacitance signals on a first capacitive touch display screen and a second capacitive touch display screen, where the first capacitive touch display screen is located on a front face of the mobile terminal, and the second capacitive touch display screen is located on a back face of the mobile terminal; determining at least one first region in which the capacitance signal on the first capacitive touch display screen meets a capacitance change threshold range, and determining at least one second region in which the capacitance signal on the second capacitive touch display screen meets the capacitance change threshold range; in response to detecting a third region and fourth region that are approaching a same side face and that are opposite to each other in a first direction, determining a side region between each pair of a third region and a fourth region that are opposite to each other as a contact region of a hand of a user and the side face, where each third region is all or a part of the first region, each fourth region is all or a part of the fourth region, and the first direction is perpendicular to the front face of the mobile terminal; and in response to detecting region changes of the third region and the fourth region that are opposite to each other in the first direction, determining a dynamic change of the hand of the user in the contact region on the side face, and determining a gesture operation of the hand of the user on the side face based on the dynamic change of the hand of the user in the contact region on the side face, where the region changes include any pair of region area changes, region capacitance signal strength changes, and region position changes.

According to an aspect, some embodiments of this application provide an operation detection apparatus. The apparatus includes: a signal detection module, configured to detect capacitance signals on a first capacitive touch display screen and a second capacitive touch display screen, where the first capacitive touch display screen is located on a front face of the mobile terminal, and the second capacitive touch display screen is located on a back face of the mobile terminal; a first region detection module, configured to: determine at least one first region in which the capacitance signal on the first capacitive touch display screen meets a capacitance change threshold range, and determine at least one second region in which the capacitance signal on the second capacitive touch display screen meets the capacitance change threshold range; a second region detection module, configured to: in response to detecting a third region and fourth region that are approaching a same side face and that are opposite to each other in a first direction, determine a side region between each pair of a third region and a fourth region that are opposite to each other as a contact region of a hand of a user and the side face, where each third region is all or a part of the first region, each fourth region is all or a part of the fourth region, and the first direction is perpendicular to the front face of the mobile terminal; and a dynamic detection module, configured to: in response to detecting region changes of the third region and the fourth region that are opposite to each other in the first direction, determine a dynamic change of the hand of the user in the contact region on the side face, and determine a gesture operation of the hand of the user on the side face based on the dynamic change of the hand of the user in the contact region on the side face, where the region changes include any pair of region area changes, region capacitance signal strength changes, and region position changes.

BRIEF DESCRIPTION OF DRAWINGS

To describe the technical solutions in the embodiments of the present invention more clearly, the following briefly describes the accompanying drawings required for describing the embodiments. In the accompanying drawings, identical reference numerals represent corresponding parts. Apparently, the accompanying drawings in the following descriptions show merely some but not all embodiments of the present invention. A person of ordinary skill in the art may still derive other drawings from these accompanying drawings without creative efforts.

DESCRIPTION OF EMBODIMENTS

The following clearly describes the technical solutions in the embodiments with reference to the accompanying drawings in some embodiments. Apparently, the described embodiments are some rather than all of the embodiments. Some well-known methods, processes, structures, and networks are not described in detail.

Embodiments of a mobile terminal and an implementation method of the mobile terminal are described below. The mobile terminal may be a mobile phone (also referred to as a smartphone), a tablet computer (Tablet Personal Computer), a personal digital assistant PDA, an e-book reader, a virtual reality interactive device, or the like. The mobile terminal may communicate with a network by means of 2G (2nd generation mobile communications technology), 3G (3rd generation mobile communications technology), 4G (4th generation mobile communications technology), 5G (5th generation mobile communications technology), or a WLAN (wireless local area network), or in a communication manner that possibly appears in future.

For brevity, this is not further limited in the embodiments of the present invention. For convenience of description, a mobile terminal is used as an example for description in the following embodiments.

The mobile terminal can support a plurality of applications, such as a telephony application, an instant messaging application, a digital camera and/or video capturing application, a web browsing application, a music and/or video playback application, a video communication application, a social network application, a financial application, a weather application, a shopping application, an office application, and the like.

Figure 1:
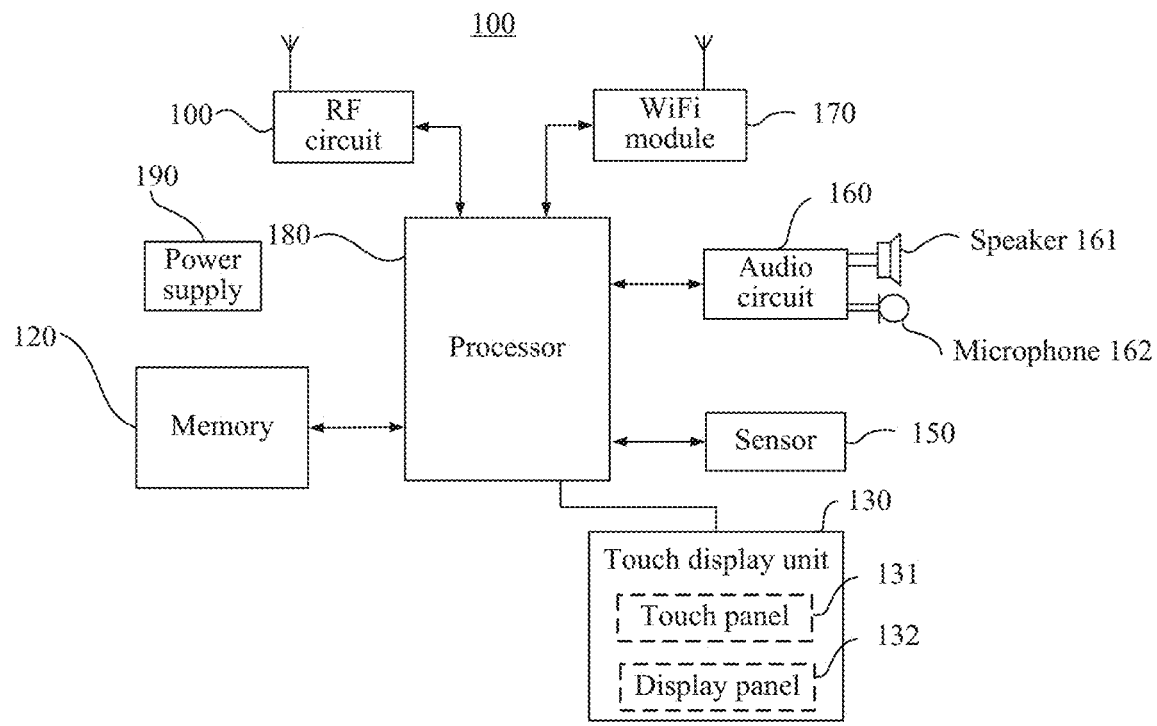
FIG. 1 is a structural block diagram of an example of a mobile phone according to some embodiments.

Preferably, the mobile terminal is a mobile phone. FIG. 1 is a structural block diagram of an example of a mobile phone 100 according to some embodiments. Referring to FIG. 1, the mobile phone 100 includes components such as an RF (Radio Frequency, radio frequency) circuit 110, a memory 120, a touch display unit 130, a sensor 150, an audio circuit 160, a WiFi (wireless fidelity, wireless fidelity) module 170, a processor 180, and a power supply 190.

A person skilled in the art may understand that the structure of the mobile phone shown in FIG. 1 is only used as an example of implementations and does not constitute a limitation on the mobile terminal, and the mobile terminal may include more components or fewer components than those shown in the figure, or some components may be combined, or a different component deployment may be used.

The components of the mobile phone 100 are specifically described below with reference to FIG. 1.

The processor 180 may be based on one or more microprocessors, microcontrollers, digital signal processors, baseband processor integrated circuits, application-specific integrated circuits, and the like.

The RF circuit 110 may be configured to receive and send signals during an information receiving and sending process or a call process. Particularly, the RF circuit 110 receives downlink information from a base station, then delivers the downlink information to the processor 180 for processing, and sends related uplink data to the base station. Generally, the RF circuit includes, but is not limited to, an antenna, at least one amplifier, a transceiver, a coupler, an LNA (Low Noise Amplifier, low noise amplifier), a duplexer, and the like. In addition, the RF circuit 110 may also communicate with a network and another device by means of wireless communication. The wireless communication may use any communication standard or protocol, which includes, but is not limited to, GSM (Global System for Mobile Communications), GPRS (general packet radio service), CDMA (Code Division Multiple Access), WCDMA (Wideband Code Division Multiple Access), LTE (Long Term Evolution), email, SMS (short messaging service), and the like.

The memory 120 may be configured to store a software program and module. The processor 180 runs the software program and module stored in the memory 120, to implement various functional applications of the mobile phone 100 and perform data processing. The memory 120 may mainly include a program storage area and a data storage area. The program storage area may store an operating system, an application program required by at least one function (such as a sound playback function and an image display function), and the like. The data storage area may store data (such as audio data and a phone book) created based on use of the mobile phone 100, and the like. In addition, the memory 120 may include a high-speed random access memory, and may also include a non-volatile memory such as at least one magnetic disk storage device, a flash memory, or another volatile solid-state storage device.

The touch display unit 130 may be configured to: receive input digit or character information, and generate key signal or action signal input related to user settings and function control of the mobile phone 100. Specifically, the touch display unit 130 may include a touch panel 131 and a display panel 132.

The touch display unit 130 includes a touch display screen. The touch display screen is a device that integrates the display panel 132 and the touch panel 131. In a preferred embodiment, the touch display screen is a capacitive touch display screen. In some embodiments, the touch panel 131 of the capacitive touch display screen has capacitive sensors formed by ITO (indium tin oxide) transparent conductive films. When a hand of a user performs contact touch or floating touch, a parasitic capacitance of a capacitive sensor changes from $C_P$ to a parallel connection of $C_P$ and $C_{finger}$. Therefore, a position touched by the user may be determined based on a change of a value of the parasitic capacitance. Specifically, the processor 180 obtains a scanning detection signal for the touch display screen, performs data processing on the scanning detection signal, determines each parasitic capacitance based on a current or voltage change of the touch display screen, and performs positioning calculation based on a capacitance value of each parasitic capacitance, to determine a contact position of the hand of the user.

Figure 2:
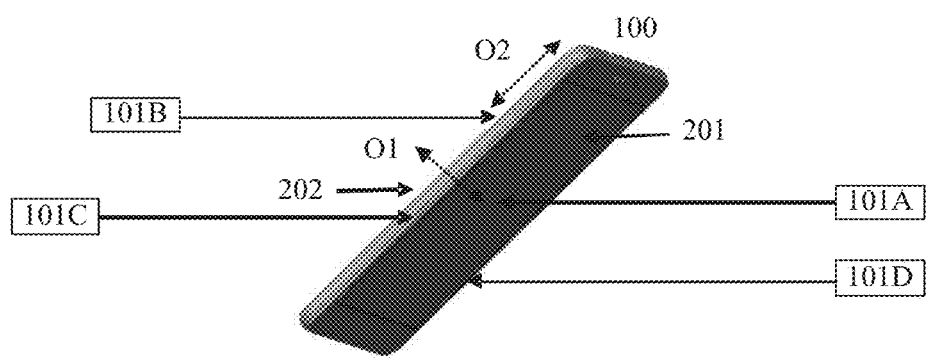
FIG. 2 is a schematic appearance view of an example of a mobile phone according to some embodiments.

As shown in FIG. 2, in a preferred embodiment, the mobile phone 100 includes a first capacitive touch display screen 201 and a second capacitive touch display screen 202 that are respectively located on a front face 101A and a back face 101B of the mobile phone 100. By means of dual-screen display on both the front face 11A and the back face 11B, the mobile phone 100 can provide more diverse display manners to users, or sharing of the mobile phone 100 among a plurality of users is facilitated. For example, when a photographing function is being used by a user, both the photographing user and a photographed user can view a captured image on the mobile phone 100.

The display panel 132 may be configured to display information entered by or provided to a user and various menus on the mobile phone 100. The display panel 132 may be configured by using an LCD (liquid crystal display), an OLED (organic light-emitting diode), or the like. Further, after detecting a touch operation on or near the touch panel 131, the touch panel 131 transfers the touch operation to the processor 180 to determine a type of a touch event. Then, the processor 180 provides corresponding actions such as visual output, volume up/down, and vibration on the display panel 132 based on the type of the touch event.

The mobile phone 100 may further include at least one sensor 150, for example, an optical sensor, a motion sensor, a capacitive sensor, and another sensor. Specifically, the optical sensor may include an ambient light sensor and a proximity sensor. The ambient light sensor may adjust luminance of the display panel 132 based on brightness of ambient light. The proximity sensor may switch off the display panel 132 and/or backlight when the mobile phone 100 is moved to an ear. As one type of motion sensor, an acceleration sensor may detect magnitude of accelerations in various directions (generally on three axes), may detect magnitude and a direction of the gravity when static, and may be applied to a mobile phone posture identification application (such as switching between horizontal and vertical screens, a related game, and magnetometer posture calibration), a function related to vibration identification (such as a pedometer and a knock), and the like. Other sensors such as a gyroscope, a barometer, a hygrometer, a thermometer, and an infrared sensor, which may be configured in the mobile phone 100, are not further described herein.

The audio circuit 160, a speaker 161, and a microphone 162 may provide audio interfaces between the user and the mobile phone 100. The audio circuit 160 may convert received audio data into an electric signal and transmit the electric signal to the speaker 161. The speaker 161 converts the electric signal into a sound signal for output. On the other hand, the microphone 162 converts a collected sound signal into an electric signal. The audio circuit 160 receives the electric signal, converts the electric signal into audio data, and outputs the audio data to the processor 180 for processing. Then, the processor 180 sends the audio data to, for example, another mobile phone by using the RF circuit 110, or outputs the audio data to the memory 120 for further processing.

WiFi belongs to a short distance wireless transmission technology. The mobile phone 100 may help, by using the WiFi module 170, the user receive and send emails, browse a web page, access streaming media, and so on. WiFi provides wireless broadband Internet access for the user. Although FIG. 1 shows the WiFi module 170, it may be understood that the WiFi module 170 is not a necessary component of the mobile phone 100, and the WiFi module 170 may be omitted based on needs as long as the scope of the essence of the present invention is not changed.

The processor 180 is a control center of the mobile phone 100, and is connected to various parts of the whole mobile phone by using various interfaces and lines. By running or executing the software program and/or module stored in the memory 120, and invoking the data stored in the memory 120, the processor 180 performs various functions and data processing of the mobile phone 100, thereby performing overall monitoring on the mobile phone. Optionally, the processor 180 may include one or more processing units. Preferably, the processor 180 may integrate an application processor and a modem processor. The application processor mainly processes an operating system, a user interface, an application program, and the like. The modem processor mainly processes wireless communication. It may be understood that the foregoing modem processor may not be integrated into the processor 180.

The mobile phone 100 further includes the power supply 190 (such as a battery) for supplying power to the components. Preferably, the power supply may be logically connected to the processor 180 by using a power management system, thereby implementing functions such as charging, discharging, and power consumption management by using the power management system.

Although not shown, the mobile phone 100 may further include a camera, a Bluetooth module, and the like, and details are not described herein.

In addition, the mobile phone 100 further has a software component. The software component may be stored in the memory 120, and may be configured to run software in the mobile phone, including an operating system, an application program, and the like. The operating system, such as an Android operating system (Android), an Apple's operating system (iOS), a UNIX operating system, a Windows operating system, or the like, is used to control various software components and/or drivers for managing general system tasks (for example, power management), and to facilitate communication between various hardware and software components. The application program may include, but is not limited to, at least one of the following: a phonebook module, an instant messaging module, a web browsing module, a video capturing module, a video playback module, a social network module, a music playback module, and the like.

In combination with the processor 180, the touch display unit 130, and a related application program, the mobile terminal performs corresponding operations and processing after receiving a signal entered by a user to the touch display unit 130, to generate a corresponding output signal and transfer the output signal to the display panel 132, so that the mobile terminal can interact with the user in a visual and operable manner. In some preferred embodiments, the touch panel 131 and the display panel 132 are implemented by the touch display screen.

In addition, the mobile terminal may further include one or more keys. The keys may be physical keys or may be softkeys displayed by using a display unit. In some embodiments, the physical keys may obtain input by means of pressing with an actual pressing force. The physical keys may include: a button used to open/close a power supply of a device and lock the device, and a button used to adjust volume. The softkeys may obtain input in the foregoing contact manner.

In some embodiments, the mobile terminal may detect a touch operation on a side face of the mobile terminal by using the first capacitive touch display screen 201 and the second capacitive display screen 202. The first capacitive touch display screen 201 and the second capacitive display screen 202 may replace physical keys such as a volume adjustment key and a lock screen key on the side face of the mobile terminal.

In an alternative embodiment, the mobile terminal 100 may further receive, by using the microphone 162, voice input used to activate some functions, or receive, by using the sensor 150, action input used to activate some functions, for example, obtain a shake action by using a gravity sensor.

In the following embodiment, as shown in FIG. 2, the first direction O1 is perpendicular to the front face 101A of the mobile terminal 100. The front face 101A of the mobile terminal may be viewed when the user uses the mobile terminal. The back face 101B is opposite to the front face, and the front face 101A and the back face 101B of the mobile terminal may be interchanged. Side faces 101C and 101D of the mobile terminal are on two sides of a viewing face when the user holds the mobile terminal in a normal viewing direction. The second direction O2 is parallel to the front face 101A and the side face 101C of the mobile terminal. The side faces 101C and 101D of the mobile terminal may be planes, or may be surfaces having particular curvature in a direction from the front face 101A to the back face 101B.

Figure 3:
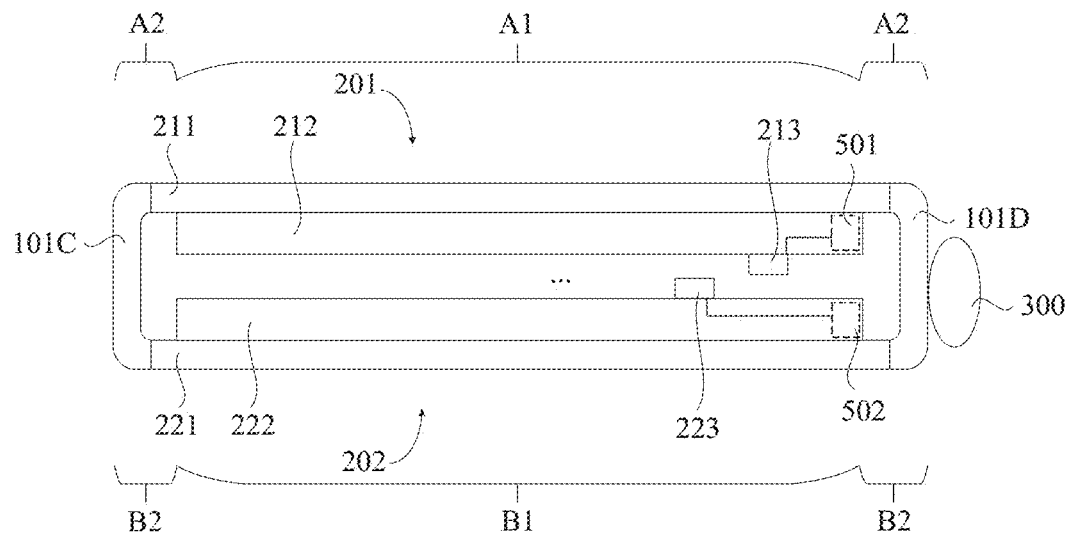
FIG. 3 is a schematic sectional view of an example of a mobile phone according to some embodiments.

FIG. 3 is a schematic sectional view of an example of a mobile phone according to some embodiments. A first capacitive touch display screen 201 includes a first cover layer 211, a first touch display structure layer 212, and several first connecting circuit structures 213. In some embodiments, the first cover layer 211 may be a tempered glass layer. On a front face of the mobile phone, the first touch display structure layer 212 is distributed in a cavity that is of the mobile phone and that corresponds to a central region A1. Lines used to provide communication or supply power to the first touch display structure layer 212 may be disposed in a cavity that is of the mobile phone and that corresponds to a frame region A2. The touch display structure layer 212 has several first capacitive sensors 501, and the several first capacitive sensors 501 are arranged in an array. A second capacitive touch display screen 202 includes a second cover layer 221, a second touch display structure layer 222, and several second connecting circuit structures 223. In some embodiments, the second cover layer 221 may be a tempered glass layer. On the back face of the mobile phone, the second touch display structure layer 222 is distributed in a cavity that is of the mobile phone and that corresponds to a central region B1. Lines used for communication or supplying power may be disposed in a cavity that is of the mobile phone and that corresponds to a frame region B2. The second touch display structure layer 222 has several second capacitive sensors 502, and the several second capacitive sensors 502 are arranged in an array.

A support housing is formed on side faces 101D and 101C of the mobile phone 100. When a hand 300, for example, when a thumb, of a user touches the side face 101D, a first capacitive sensor 501 that is of the touch display structure layer 212 of the first capacitive touch display screen 201 and that is in proximity to (not coining into contact with) the side face 101D generates a change of a capacitance signal, and sends the capacitance signal to a processor 180 by using the first connecting circuit structure 213. Similarly, a second capacitive sensor 502 generates a change of a capacitance signal, and sends the capacitance signal to the processor 180 by using the second connecting circuit structure 223, for the processor 180 to perform detection and identification.

Figure 4A:
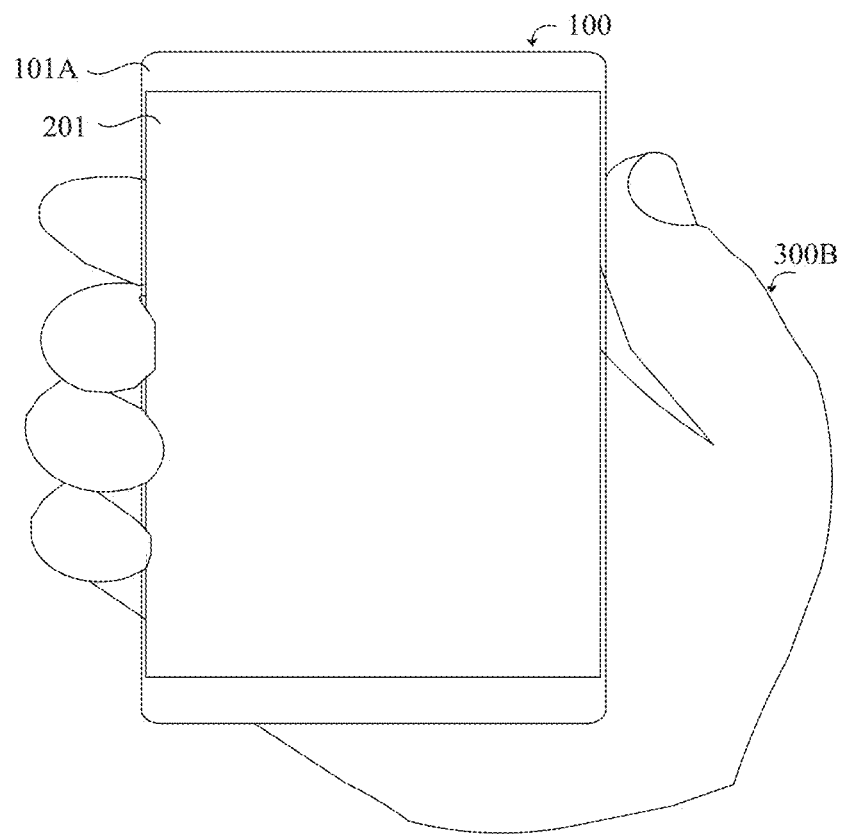
FIG. 4(a) to FIG. 4(c) are schematic diagrams of a mobile terminal held by a hand of a user according to some embodiments.
Figure 4B:
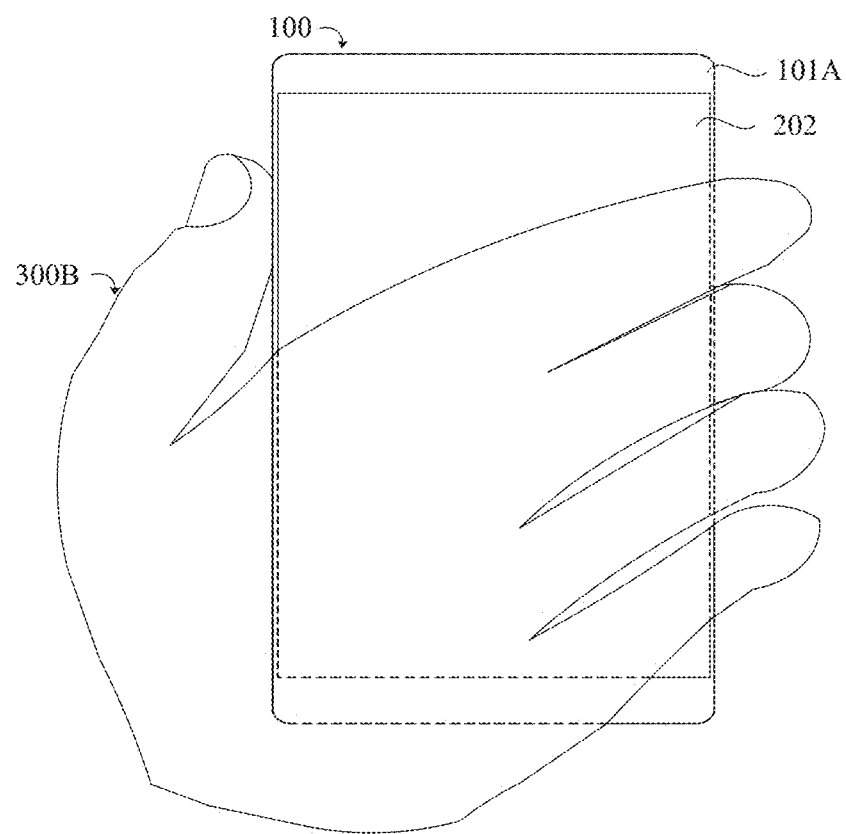
Figure 4C:
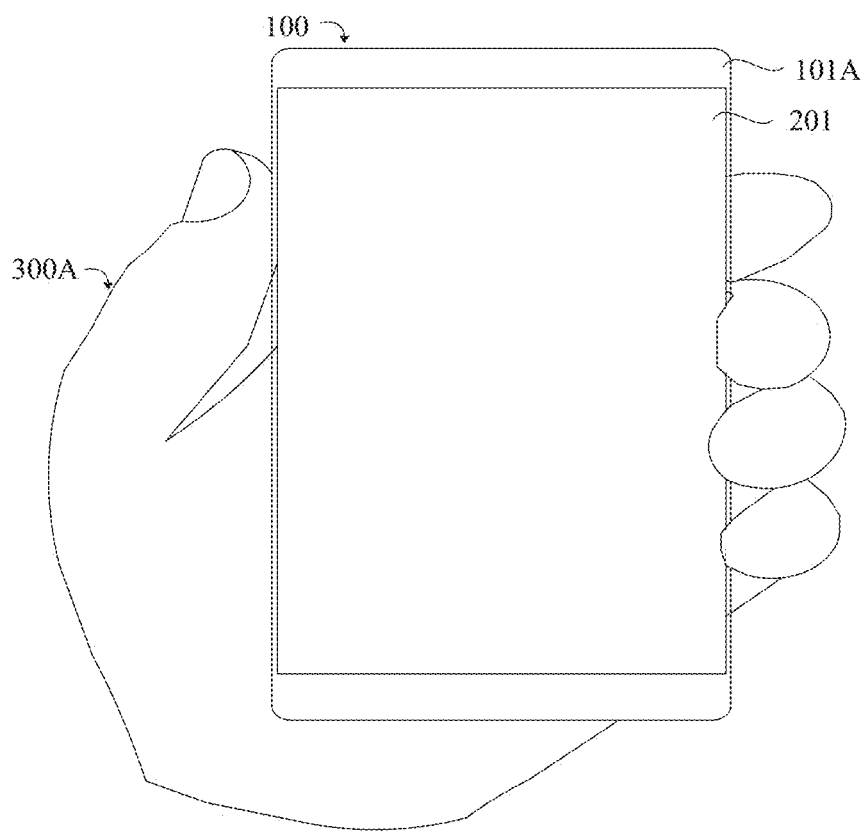

FIG. 4(*a*) is a schematic diagram of an example of a front face of a mobile terminal held by the right hand of a user according to some embodiments. FIG. 4(*b*) is a schematic diagram of a back face of the mobile terminal held by the right hand of the user according to some embodiments. With reference to FIG. 4(*a*) and FIG. 4(*b*), in some embodiments, there is a first capacitive touch display screen 201 on the front face 101A of the mobile terminal 100, and there is a second capacitive touch display screen 202 on the back face 101B of the mobile terminal 100. The user may enter a control instruction for various touch operations on the first capacitive touch display screen 201 and the second capacitive touch display screen 202, including controlling a directed object by coming into contact with a corresponding region by using one or more fingers or a stylus. The contact may include one tap, a plurality of continuous taps, or staying on a touch display screen and sliding (from left to right, from right to left, upward/downward, circling, or the like). For example, when a finger of the user stays on the touch display screen and slides, the touch display screen displays a translation process of a current page in a sliding direction. The two touch display screens are used to display a user interface for interacting with the user, can intuitively display the user interface, and display interaction with the user in a manner easy to operate.

FIG. 4(*a*) and FIG. 4(*b*) are schematic diagrams of the mobile terminal 100 held by the right hand 300B of the user. With reference to FIG. 4(*c*), the left hand 300A of the user may alternatively hold the mobile terminal 100. This is not limited.

Figure 5:
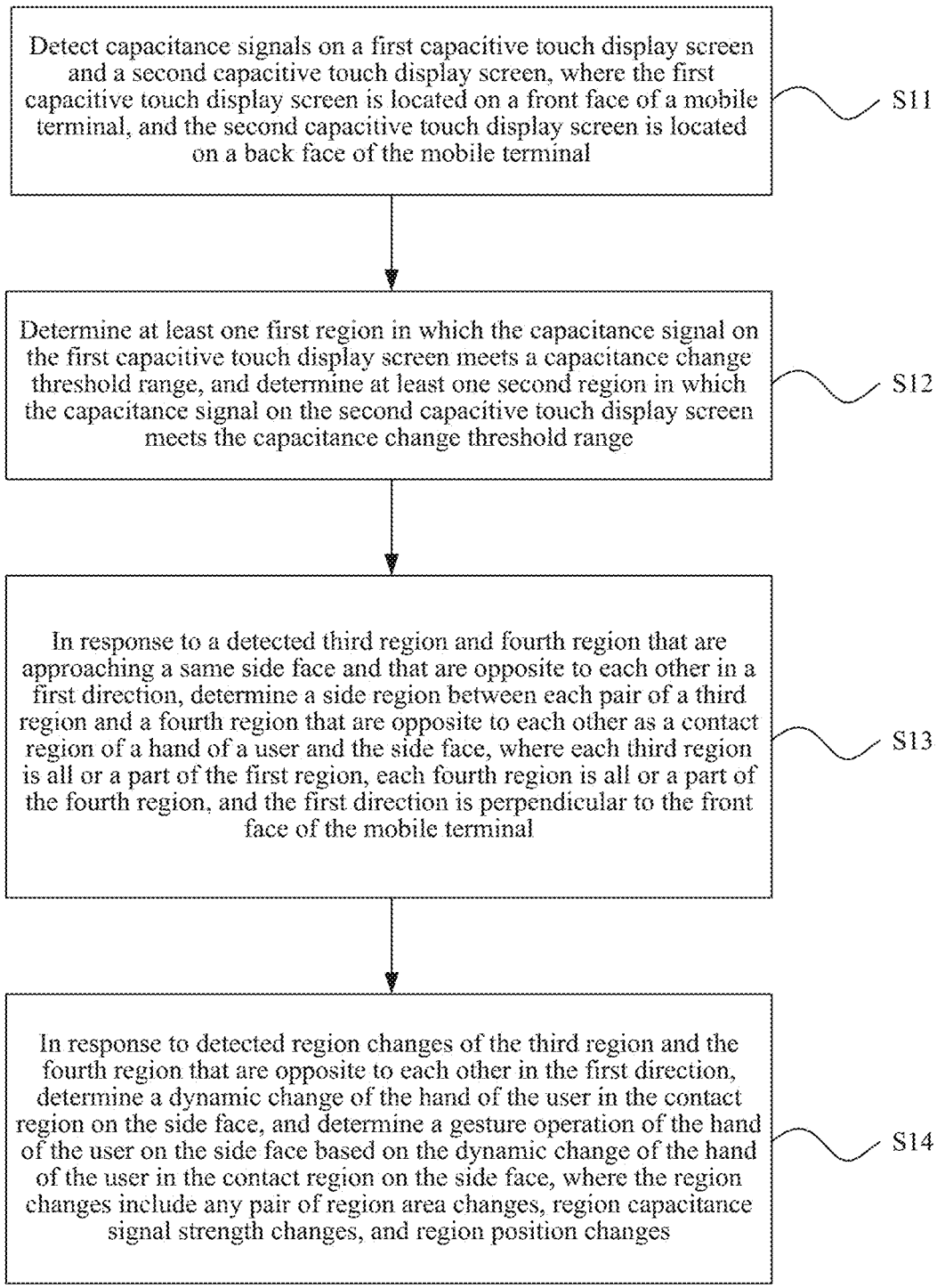
FIG. 5 is a schematic flowchart of an operation detection method according to some embodiments.

FIG. 5 is a flowchart of an operation detection method implemented by a mobile terminal according to some embodiments. The operation detection method provides a method for detecting a gesture operation of a hand of a user on a side face of the mobile terminal.

The method includes step S11 to step S14. In step S11, the mobile terminal detects capacitance signals on a first capacitive touch display screen and a second capacitive touch display screen. The first capacitive touch display screen is located on a front face of the mobile terminal, and the second capacitive touch display screen is located on a back face of the mobile terminal. Then, in step S12, the mobile terminal determines at least one first region in which the capacitance signal on the first capacitive touch display screen meets a capacitance change threshold range (specific values of the threshold range are specifically determined based on a process requirement and product precision), and determines at least one second region in which the capacitance signal on the second capacitive touch display screen meets the capacitance change threshold range. Next, in step S13, based on a third region and a fourth region that are approaching a same side face and that are opposite to each other in a first direction, the mobile terminal determines a side region between the third region and the fourth region that are opposite to each other as a contact region of a hand of a user and the side face. Each third region is all or a part of the first region, each fourth region is all or a part of the fourth region, and the first direction is perpendicular to the front face of the mobile terminal. Subsequently, in step S14, the mobile terminal determines a dynamic change of the hand of the user in the contact region on the side face based on any pair of area changes, capacitance signal strength changes, and position changes of the third region and the fourth region that are opposite to each other in the first direction, and determines a gesture operation of the hand of the user on the side face based on the dynamic change of the hand of the user in the contact region on the side face.

Herein, the contact region of the hand of a user and the side face includes: a contact touch region of the hand of the user and the side face; and/or a floating touch region of the hand of the user and the side face.

On the front face and the back face, the mobile terminal has the first capacitive touch display screen and the second capacitive touch display screen respectively. In a preferred embodiment, the first capacitive touch display screen and the second capacitive touch display screen include capacitive sensors formed by mutual-capacitance sensors. The capacitive sensors formed by the mutual-capacitance sensors support a multipoint touch function. In some embodiments, the first capacitive touch display screen and the second capacitive touch display screen may alternatively include capacitive sensors formed by combining mutual-capacitance sensors and self-capacitance sensors. The first capacitive touch display screen and the second capacitive touch display screen may be used to detect a contact touch or a floating touch of the hand of the user on the side face.

On the front face and the back face of the mobile terminal, the mobile terminal has the first capacitive touch display screen and the second capacitive touch display screen respectively. When the hand (for example, a finger) of the user approaches from a side face and comes into contact with a mobile phone, a capacitance effect is generated both between the finger and a capacitive sensor of the first capacitive touch display screen and between the finger and a capacitive sensor of the second capacitive touch display screen, thereby changing both a parasitic capacitance that is on the first capacitive touch display screen, in proximity to the side face, and close to a finger part and a parasitic capacitance that is on the second capacitive touch display screen, in proximity to the side face, and close to the finger part. Values of the parasitic capacitances at opposite positions on the two display screens are related to a position of the user on the side face of the mobile terminal. Therefore, a contact position of the hand of the user on the side face of the mobile terminal can be determined by collecting scanning signals on the first capacitive touch display screen and the second capacitive touch display screen and determining capacitance signals about the parasitic capacitances in the scanning signals. Further, changes of the capacitance signals over time are determined by using the dynamically collected scanning signals, so as to determine a touch operation of the hand of the user on the side face of the mobile terminal.

In some specific embodiments, in step S11, the mobile terminal detects the capacitance signal on the first capacitive touch display screen and the capacitance signal on the second capacitive touch display screen separately.

In some embodiments, the first capacitive touch display screen is used as an example. The first capacitive touch display screen includes drive lines arranged in the first direction and sensing lines arranged in a direction perpendicular to the first direction. Sensing points are formed at positions of intersection points of the sensing lines and the drive lines. In each frame of scanning, a processor stores scanning data by controlling a signal generator in the capacitive touch display screen to send a drive signal to the drive lines column by column and the sensing lines to receive a sensing signal row by row, until the last row is scanned; and performs comprehensive calculation (for example, averaging) after collecting scanning data of a plurality of continuous frames, so as to obtain collected data of the capacitance signal on the first capacitive touch display screen. The first capacitive touch display screen has a plurality of sensing points distributed in an array, and the collected data includes a capacitance signal at each sensing point.

For a method for detecting the capacitance signal on the second capacitive touch display screen, refer to the method for detecting the capacitance signal on the first capacitive touch display screen. For brevity, details are not described again.

Figure 6A:
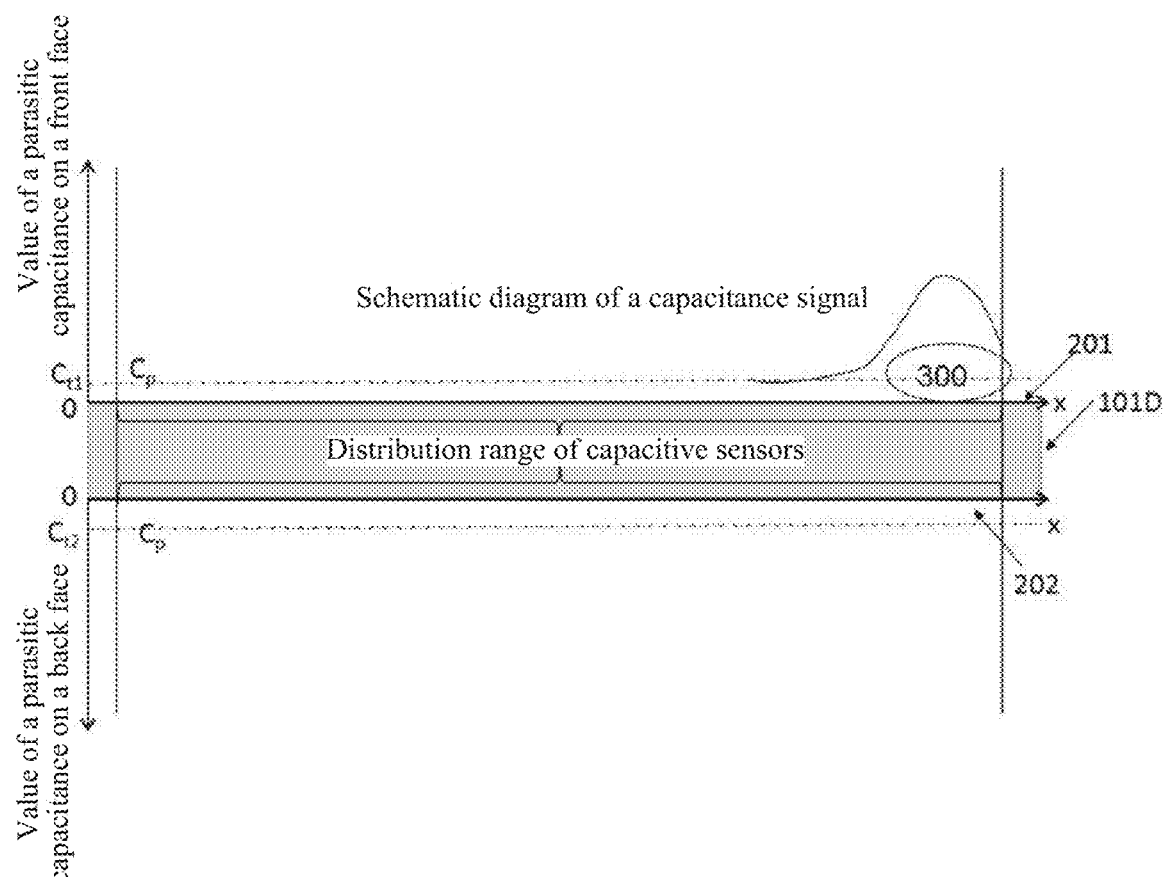
FIG. 6(a) is a schematic diagram of a capacitance signal when a hand of a user touches a first capacitive display screen according to some embodiments.
Figure 6B:
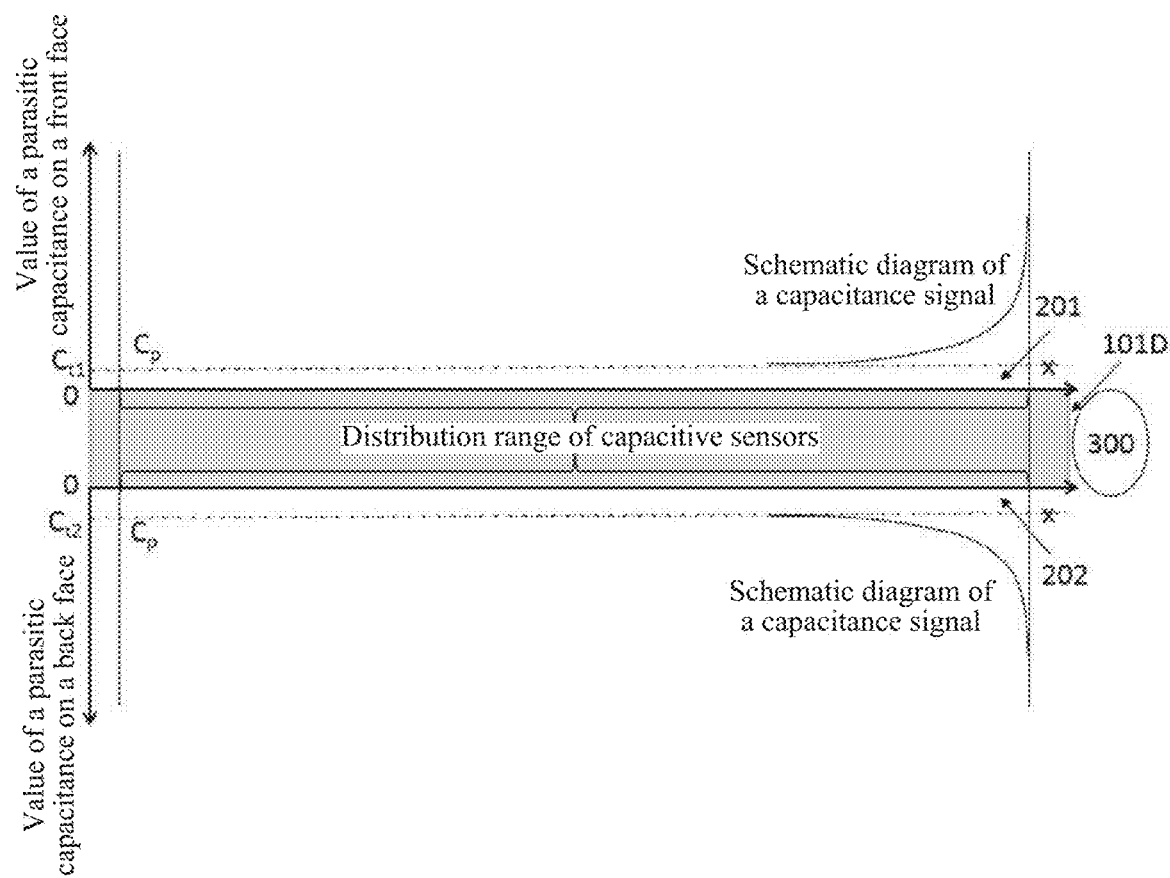
FIG. 6(b) is a schematic diagram of a capacitance signal when a hand of a user touches a side face of a mobile phone according to some embodiments.

With reference to FIG. 6(a) and FIG. 6(b), in some embodiments, when a hand 300 (for example, a finger) of the user touches a front face 101A of the mobile phone, an example of a capacitance signal received on a first capacitive touch display screen 201 on the front face 101A is shown in FIG. 6(a). With reference to FIG. 6(b), when the hand 300 of the user touches a side face 101D of the mobile phone, the capacitance signal received on the first capacitive touch display screen 201 on the front face 101A and a capacitance signal received on a second capacitive touch display screen 202 on a back face 101B are shown in FIG. 6(b).

Then, in step S12, the at least one first region in which the capacitance signal on the first capacitive touch display screen meets the capacitance change threshold range is determined, and the at least one second region in which the capacitance signal on the second capacitive touch display screen meets the touch capacitance change threshold range is determined.

Following the foregoing embodiments, still referring to FIG. 6(a) and FIG. 6(b), a capacitance signal $C_P$ at each sensing point on the two screens is determined based on collected data of the capacitance signals on the first capacitive touch display screen 201 and the second capacitive touch display screen 202.

In some specific embodiments, when a capacitance signal $C_P$ collected by a capacitive sensor reaches the capacitance change threshold range (for example, exceeding a specified capacitance change threshold), the mobile phone 100 determines that a gesture operation action starts. In a couple of (for example, 20) sampling periods in which the capacitance change threshold is exceeded, the mobile terminal 100 obtains a motion center of the hand by using a method for solving a geometric center of a sensing point at which a valid capacitance signal $C_P$ can be collected. Capacitance signals $C_P$ on the capacitive sensor and a couple of surrounding capacitive sensors (it is temporarily set that there is one capacitive sensor at both the left side and the right side of the capacitive sensor) are separately extracted to perform a geometric operation (for example, solving an arithmetic average), to determine a valid capacitance signal $C_P$ and a position of a sensing point corresponding to the capacitance signal $C_P$. In addition, data is sequentially stored based on time, for gesture analysis.

In some embodiments, the capacitance change threshold range may be set to be greater than $C_{t1}$ on the first capacitive touch display screen 201 and greater than $C_{t2}$ on the second capacitive display screen 202. $C_{t1}$ and $C_{t2}$ may be the same or be different, and $C_{t1}$ and $C_{t2}$ are specifically determined based on performance of the two capacitive touch display screens.

When the capacitance signal $C_P$ meets the capacitance change threshold range, it is determined that a touch at a corresponding sensing point can be sensed. Then, a plurality of adjacent sensing points at which a touch can be sensed are combined to form a first region. The first region may be one region or a plurality of nonadjacent regions.

For a method for determining the at least one second region on the second capacitive touch display screen, refer to the method for determining the at least one first region on the first capacitive touch display screen. For brevity, details are not described again.

Figure 7A:
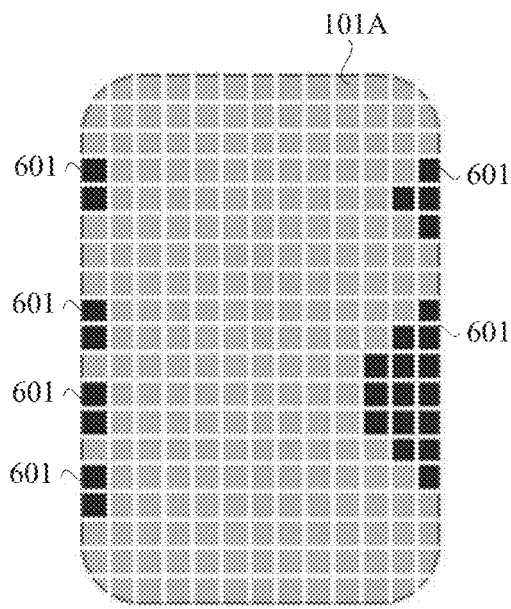
FIG. 7(a) and FIG. 7(b) are schematic diagrams of a determined first region and second region according to some embodiments.
Figure 7B:
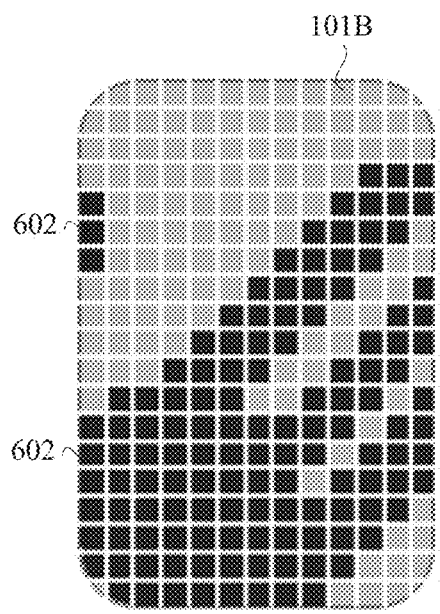

With reference to FIG. 7(a) and FIG. 7(b), when the hand of the user holds the mobile terminal, as shown in FIG. 4(a) and FIG. 4(b), several first regions 601 are formed on the front face 101A of the mobile terminal 100, and several second regions 602 are formed on the back face 101B of the mobile terminal 100.

Then, in step S13, based on the third region and the fourth region that are approaching the same side face and that are opposite to each other in the first direction, the side region between the third region and the fourth region that are opposite to each other is determined as the contact region of the hand of the user and the side face. Each third region is all or a part of the first region, each fourth region is all or a part of the fourth region, and the first direction is perpendicular to the front face of the mobile terminal.

Figure 8A:
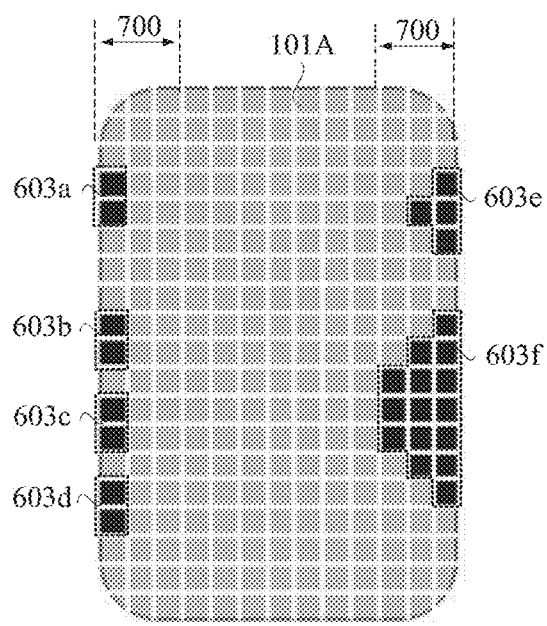
FIG. 8(a) and FIG. 8(b) are schematic diagrams of a determined third region and fourth region according to some embodiments.
Figure 8B:
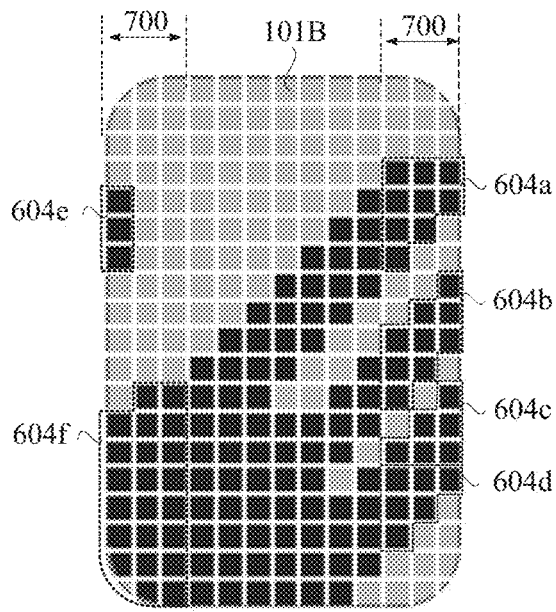

With reference to FIG. 8(a) and FIG. 8(b), the region 700 in proximity to the side face is a region that is on the front face of the mobile terminal 100 and that has a specified width from the side face to the center. The region includes several columns of capacitive sensors, and the specified width may be determined based on sensitivity of the capacitive sensors.

A plurality of pairs of third regions and fourth regions that are located in the region 700 in proximity to the side face and whose projections in the first direction O1 are partially or totally overlapped are determined in the first regions 601 and the second regions 602, for example, a third region 603a and a fourth region 604a, a third region 603b and a fourth region 604b, a third region 603c and a fourth region 604c, a third region 603d and a fourth region 604d, a third region 603e and a fourth region 604e, and a third region 603f and a fourth region 604f. Each third region (603a to 603f) is located in the first region 601, and each fourth region (604a to 604f) is located in the second region 602.

The third region (603a to 603f) is all or a part of the first region 601 in the region 700 on the first capacitive touch display screen 201 and in proximity to the side face. The fourth region (604a to 604f) is all or a part of the second region 602 in the region 700 on the second capacitive touch display screen 202 and in proximity to the side face. Based on each pair of a third region and a fourth region that correspond to each other in the first direction O1, a side region between each pair of the third region and the fourth region is determined as a contact region of the hand of the user and the side face.

Figure 8C:
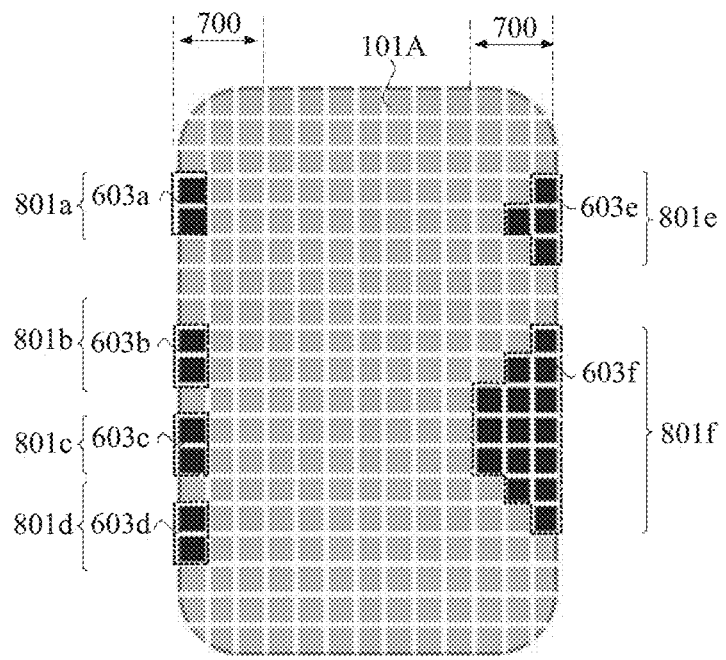
FIG. 8(c) is a schematic diagram of a determined position at which a hand of a user comes into contact with a side face of a mobile phone according to some embodiments.

When the user is holding the mobile phone, several fingers and a part of a palm may possibly come into contact with the side face of the mobile terminal. Therefore, the contact region of the hand of the user and the side face may be one region or may be a plurality of discontinuous regions. In addition, the mobile phone has two side faces. Therefore, the hand of the user and each of the side faces may have a contact region, and there may be one or more contact regions. As shown in FIG. 8(c), a plurality of contact positions (801a to 801f) that are of the hand of the user on the side faces and that are determined based on the plurality of pairs of third regions and fourth regions in FIG. 8(a) and FIG. 8(b) include: 801a determined based on the third region 603a and the fourth region 604a, 801b determined based on the third region 603b and the fourth region 604b, 801c determined based on the third region 603c and the fourth region 604c, 801d determined based on the third region 603d and the fourth region 604d, 801e determined based on the third region 603e and the fourth region 604e, and 801f determined based on the third region 603f and the fourth region 604f.

In some embodiments, one third region and one fourth region are opposite to each other and are paired in the first direction. Areas of a third region and a fourth region that are paired are not necessarily the same or a third region and a fourth region that are paired are not necessarily directly opposite to each other. For example, when a distance between the contact position of the hand of the user on the side face 101C or 101D and the first capacitive touch display screen 20I is less than a distance between the contact position of the hand of the user on the side face 101C or 101D and the second capacitive touch display screen 202, in a pair, an area of a third region may be greater than an area of a fourth region (for example, the third region 603e and the fourth region 604e in FIG. 8(a) and FIG. 8(b)). On the contrary, an area of a third region may be less than an area of a fourth region (for example, the third region 603a and the fourth region 604a in FIG. 8(a) and FIG. 8(b)).

In some embodiments, when a relative area of the third region 603 and the fourth region 604 meets a preset area threshold or an area ratio meets a preset area ratio threshold, it can be determined that the hand of the user comes into contact with a region on the side face between the third region 603 and the fourth region 604.

In some embodiments, when the hand of the user comes into contact with the side face, an inclination direction of the hand of the user with respect to the second direction is determined based on distribution of the third region 603 and the fourth region 604 that correspond to each other. When a thumb of the user comes into contact with the side face, and when the thumb comes into contact with the side face, an extending direction from the root to the fingertip of the thumb may be parallel to or inclined to the front face of the mobile terminal. When the thumb comes into contact with the side face, if it is detected that the determined third region 603 and fourth region 604 are not completely directly opposite to each other, an inclination angle of the thumb with respect to the front face of the mobile terminal may be determined based on a position relationship between the areas of the two regions. For example, the areas of the third region 603 and the fourth region 604 are the same, but projections of the third region 603 and the fourth region 604 are not completely overlapped, and a position of the third region 603 in the second direction is closer to the top of the mobile phone. Therefore, it may be deduced that the thumb is inclined to the front face, and the thumb is raised upward from the root and extends to the front face.

Figure 9:
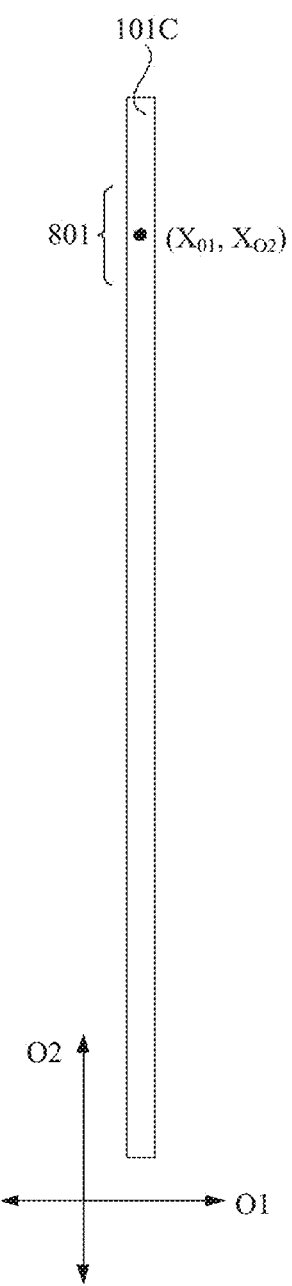
FIG. 9 is a schematic diagram of a determined position at which a hand of a user comes into contact with a side face of a mobile phone according to some embodiments.

In some embodiments, as shown in FIG. 9, based on relative positions of the third region 603 and the fourth region 604 that are opposite to each other in the first direction, it is determined that a center of the contact position of the hand of the user on the side face is at a first position $X_{O2}$ in the second direction on the side face, and based on an area relationship between the third region 603 and the fourth region 604 that are opposite to each other in the first direction, it is determined that the center of the contact position of the hand of the user on the side face is at a second position $X_{O1}$ in the first direction on the side face.

Next, in the subsequent step S14, the gesture operation of the hand of the user on the side face may be determined based on position changes of the first position and the second position on the side face over time.

Then, in step S14, the dynamic change of the hand of the user in the contact region on the side face is determined based on region changes (any pair of region area changes, region capacitance signal strength changes, and region position changes) of the third region and the fourth region that are opposite to each other in the first direction, and the gesture operation of the hand of the user on the side face is determined based on the dynamic change of the hand of the user in the contact region on the side face.

In some embodiments, in step S14: In response to detecting that for the third region and the fourth region that are opposite to each other in the first direction, a region area of the third region gradually increases and a region area of the fourth region gradually decreases over time, or a region area of the third region gradually decreases and a region area of the fourth region gradually increases over time, movement of the hand of the user in the first direction in the contact region on the side face is determined. A sliding operation of the hand of the user in the first direction on the side face is determined based on the movement of the hand of the user in the first direction in the contact region on the side face.

In some embodiments, in step S14: In response to detecting that for the third region and the fourth region that are opposite to each other in the first direction, a region capacitance signal in the third region gradually increases and a region capacitance signal in the fourth region gradually decreases over time, or a region capacitance signal in the third region gradually decreases and a region capacitance signal in the fourth region gradually increases over time, movement of the hand of the user in the first direction in the contact region on the side face is determined. A sliding operation of the hand of the user in the first direction on the side face is determined based on the movement of the hand of the user in the first direction in the contact region on the side face.

Figure 11:
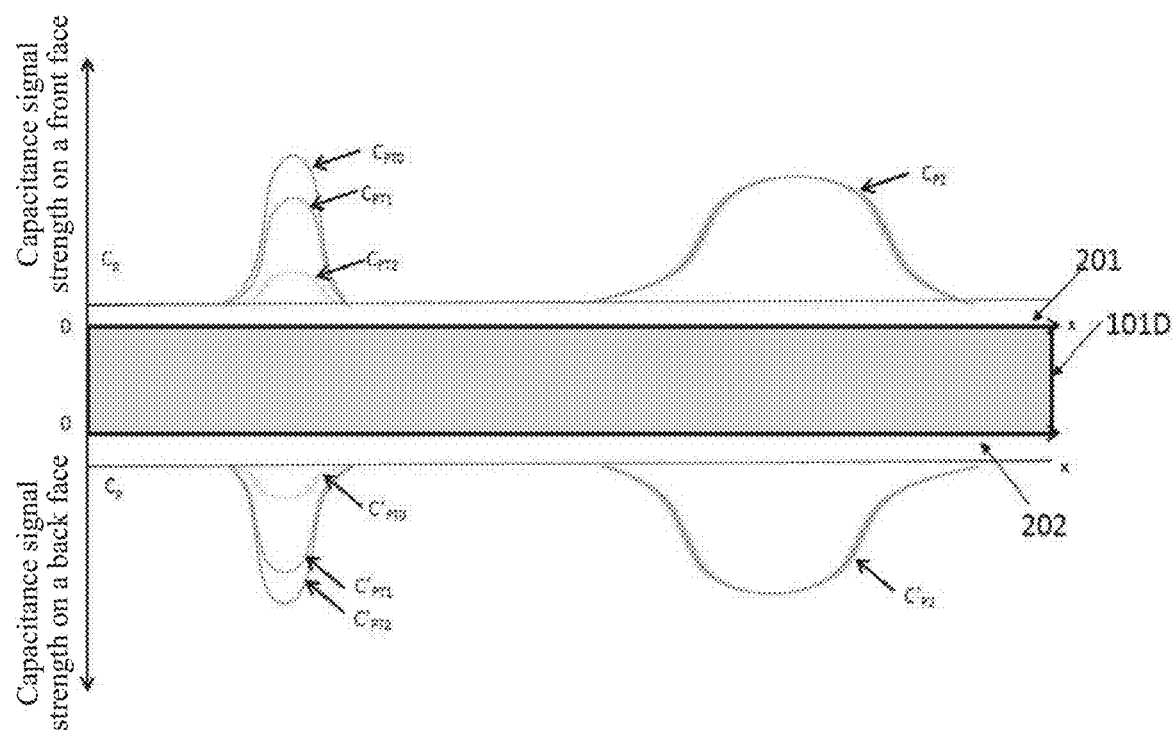
FIG. 11 is a schematic diagram of a change of a capacitance signal when a hand of a user moves in a first direction on a side face of a mobile phone according to some embodiments.

FIG. 11 is a schematic diagram of a method for determining movement of the hand of the user in the first direction in the contact region on the side face based on particular changes of capacitance signal strengths in the third region and the fourth region that are opposite to each other in the first direction over time. A region capacitance signal strength in each third region may be an average capacitance signal strength in the third region, or may be a maximum capacitance signal strength in the region.

Figure 10:
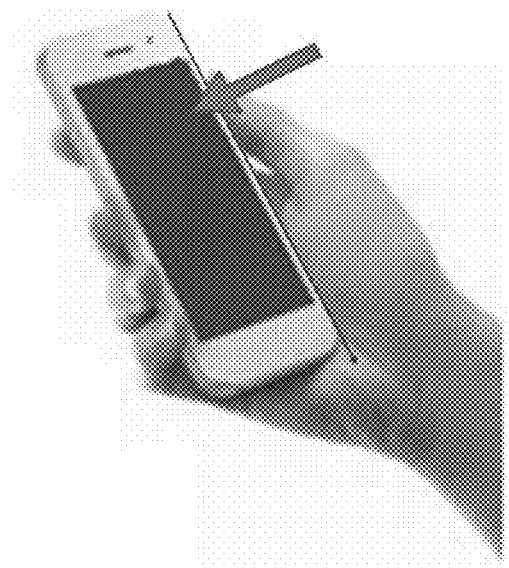
FIG. 10 is a schematic diagram of movement of a hand of a user in a first direction on a side face of a mobile phone according to some embodiments.

As shown in FIG. 11, at time points $T_0$, $T_1$, and $T_2$, it is detected that capacitance signal strengths in the third region 603 on the first capacitive touch display screen 201 are $C_{PT0}$, $C_{PT1}$, and $C_{PT2}$, where $C_{PT0} > C_{PT1} > C_{PT2}$, and it is detected that signal strengths in the corresponding fourth region 603 on the second capacitive touch display screen 201 are $C''_{PT0}$, $C'_{PT1}$, and $C'_{PT2}$, where $C'_{PT0} < C'_{PT1} < C'_{PT2}$. The capacitance signal strengths in the third region 603 at the time points $T_0$, $T_1$, and $T_2$ become weaker and the capacitance signal strengths in the fourth region 604 at the time points $T_0$, $T_1$, and $T_2$ become stronger. In this way, it can be determined that the contact region of the hand of the user on the side face slides from the front face 101A to the back face 101B in the first direction O1, and a gesture operation is shown in FIG. 10. In addition, $C_{P2}$ and $C_{P2}$ are capacitance signals obtained when a palm comes into contact with a side frame. If the capacitance signals are the same at the time points $T_0$, $T_1$, and $T_2$, it indicates that there is no movement.

In some embodiments, for the front face 101A and the back face 101B, a value of an average capacitance signal first becomes large and then becomes small as the thumb approaches and leaves the front face 101A. However, because the thumb slides from the first capacitive touch display screen to the second capacitive touch display screen, a time point corresponding to a maximum value of the capacitance signal obtained by means of sampling on the first capacitive touch display screen is earlier than a time point for a maximum value of the capacitance signal obtained on the second capacitive touch display screen. When the thumb slides from the first capacitive touch display screen to the second capacitive touch display screen, the mobile phone 100 may also determine, based on a time sequence of occurrences of maximum values, a sequence of sliding the screens, so as to determine a gesture operation direction of the thumb.

In some embodiments, when the thumb does not slide from the first capacitive touch display screen to the second capacitive touch display screen, but slides from a center frame of the side face (surface C or D) to either of two sides (surface A or B), the capacitance signal collected on the first capacitive touch display screen also has a maximum value, and data collected on the second capacitive touch display screen does not have a maximum value. In this way, it can be determined that the thumb slides from the center frame to the surface A.

In some embodiments, movement of the hand of the user in the second direction in the contact region on the side face is determined based on relative movement, in the second direction, of the third region 603 and the fourth region 604 that are opposite to each other in the first direction. Then, the sliding operation of the hand of the user in the second direction on the side face is determined based on the movement of the hand of the user in the second direction in the contact region on the side face.

Figure 12:
FIG. 12 is a schematic diagram of movement of a hand of a user in a second direction on a side face of a mobile phone according to some embodiments.
Figure 13:
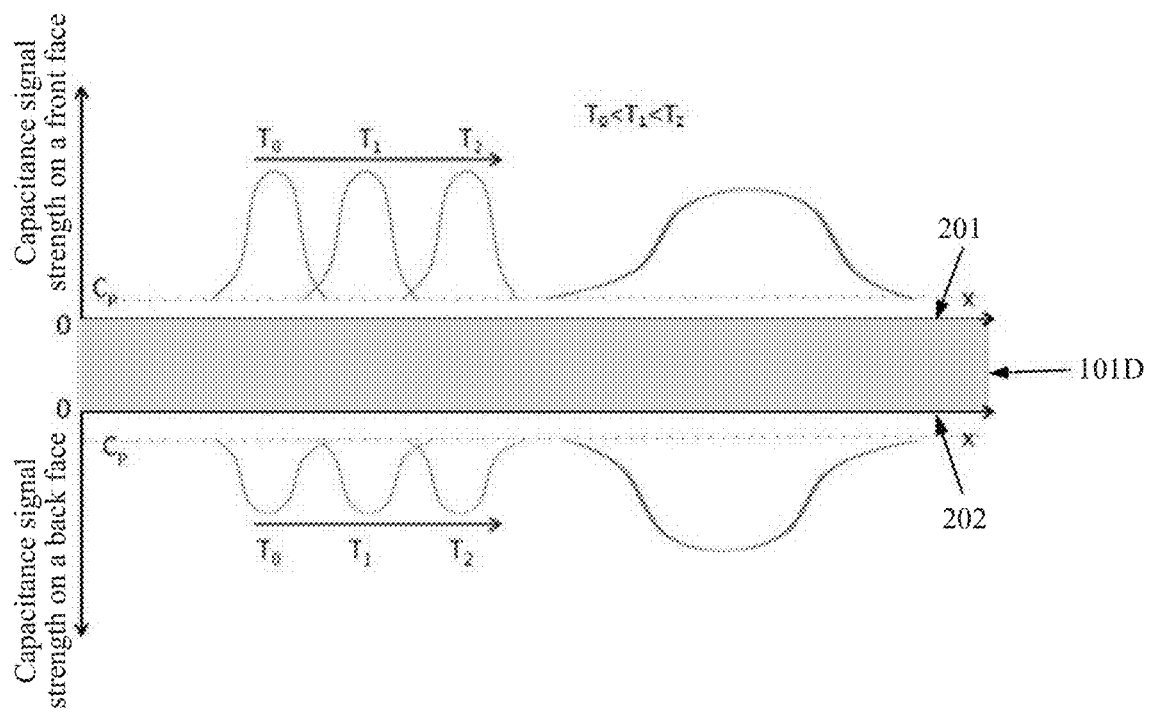
FIG. 13 is a schematic diagram of a change of a capacitance signal when a hand of a user moves in a second direction on a side face of a mobile phone according to some embodiments.

FIG. 13 is a schematic diagram of a method for determining movement of the hand of the user in the second direction in the contact region on the side face based on changes of capacitance signals in the third region 603 and the fourth region 604 that are opposite to each other in the first direction over time according to some embodiments. From the time point $T_0$, to the time point $T_1$, and to the time point $T_2$, the third region 603 on the surface A moves in an X-axis direction, and the opposite fourth region 604 on the surface B also moves in the X-axis direction. In this case, it can be determined that the hand of the user moves in the second direction O2 in the contact region on the side face, and specifically, it can be determined that the hand of the user slides from top to bottom in the second direction O2, and that a gesture operation is shown in FIG. 12.

Figure 14A:
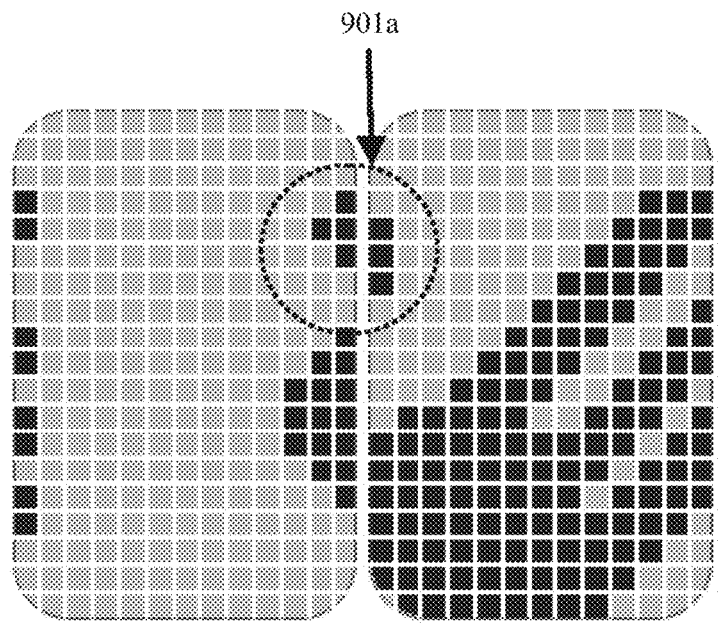
FIG. 14(a) to FIG. 14(c) are schematic diagrams of changes of a third region and a fourth region when a hand of a user moves on a side face of a mobile phone according to some embodiments.
Figure 14B:
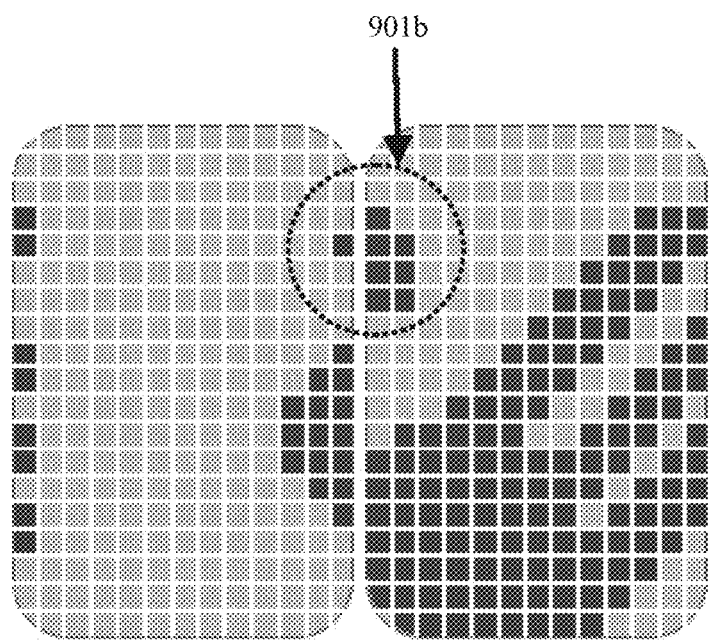
Figure 14C:
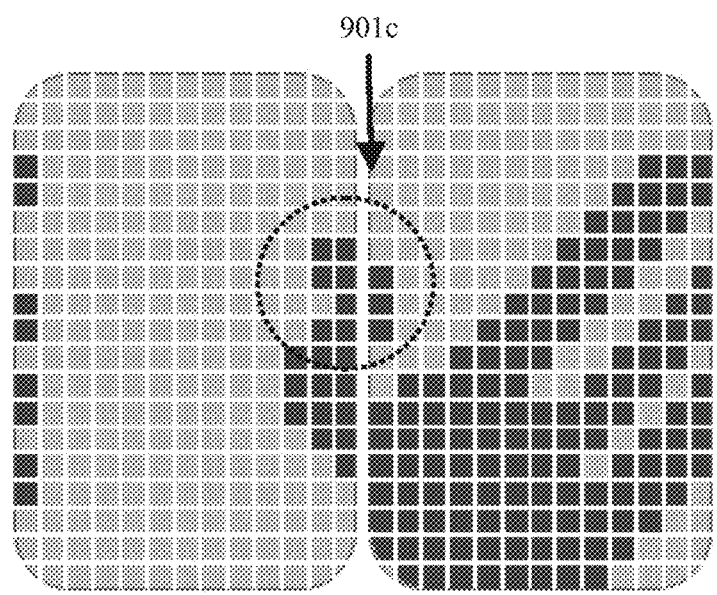

FIG. 14(a) to FIG. 14(c) are schematic diagrams of a method for relative area changes and position changes of the third region 603 and the fourth region 604 according to some embodiments.

As shown in FIG. 14(a) and FIG. 14(b), a pair of the third region 603 and the fourth region 604 that are opposite to each other change from a position shown by 901a to a position shown by 901b. An area of the third region 603 is reduced and an area of the fourth region is increased. In this way, it can be determined that a corresponding contact region of the hand of the user on the side face between the third region 603 and the fourth region 604 slides from the front face 101A to the back face 101B in the first direction O1, and it can be determined that a gesture operation is shown in FIG. 10.

As shown in FIG. 14(a) and FIG. 14(c), the third region 603 and the fourth region 604 change from the position shown by 901a to a position shown by 901c, and the third region 603 and the fourth region 604 simultaneously move in the second direction. In this way, it can be determined that the contact region of the hand of the user on the side face slides from top to bottom in the second direction O2, and a gesture operation is shown in FIG. 12.

In some embodiments, based on that the third region and the fourth region that are opposite to each other in the first direction appear and then simultaneously disappear within a first time threshold (or simultaneously disappear within a particular time error range), it is determined that the hand of the user comes into contact with and then leaves the contact region on the side face within the first time threshold. Then, the tap operation of the hand of the user on the side face is determined based on that the hand of the user comes into contact with and then leaves the contact region on the side face within the first time threshold.

In some embodiments, based on a determined center point position ($X_{O1}$, $X_{O2}$) in FIG. 8, movement of the center point position over time is dynamically monitored, so as to determine a dynamic change of the hand of the user in the contact region on the side face, and further determine a gesture operation of the hand of the user on the side face.

In an embodiment in an actual scenario, the foregoing embodiment of determining the dynamic change of the hand of the user in the contact region on the side face may be used in combination.

Because the determined contact region of the hand of the user and the side face may be one region or may be a plurality of discontinuous regions. In some embodiments, when there are a plurality of discontinuous regions, a multipoint gesture operation of the hand of the user on the side face may be determined based on a dynamic change of the hand of the user in the plurality of contact regions on the side face, thereby implementing operation detection of a multipoint gesture.

In some embodiments, the contact region of the hand of the user on the side face of the mobile terminal and the dynamic change of the hand of the user are determined by using electrical characteristics of the two capacitive touch display screens of the mobile terminal based on the detected capacitance signals on the two capacitive touch display screens, and the gesture operation of the hand on the side face may be determined without adding a sensor to the side face of the mobile terminal to sense a gesture, improving sensitivity of identifying a gesture on the side face, and accurately identifying the gesture operation of the hand of the user on the side face.

In addition, the dynamic change of the hand of the user in the contact region on the side face may be determined based on changes of the capacitance signals on the two capacitive touch display screens of the mobile terminal, and the gesture operation, including longitudinal sliding (sliding from top to bottom on the side face), vertical sliding (sliding from the front face to the back face or from the back face to the front face on the side face), a tap, or another gesture operation, of the hand of the user on the side face may be further determined, increasing diversity of an identifiable operation, having better operation flexibility compared with a physical key disposed on a side face of a mobile terminal in the prior art, and improving user experience.

In some embodiments, the operation detection method may replace a method in which the physical key is used to identify a gesture operation of a user on the side face. A physical key may be no longer disposed on the side face of the mobile terminal, thereby helping improve smoothness and aesthetics of an appearance of the mobile terminal.

In some embodiments, the operation method further includes step S15, step S16, and step S17. In step S15, the mobile terminal detects an application program that is currently being run. In step S16, in response to detecting the gesture operation of the hand of the user on the side face, the mobile terminal associates the gesture operation with the application program, and determines an operation instruction. In step S17, the mobile terminal executes the operation instruction.

In step S15, the mobile terminal detects the application program that is currently being run. In some embodiments, the mobile terminal detects whether an interface currently displayed on the first capacitive touch display screen or the second capacitive touch display screen of the mobile terminal is a system interface or an application interface, and when the interface is a system interface, detects an application program on the current system interface, or when the interface is an application interface, detects an application program of a corresponding application.

In some embodiments, the system interface may be a system desktop interface, a conversation interface, a short messaging service message viewing interface, or the like. In some embodiments, the application interface may be a music playback interface, an e-book reading interface, a sound recording interface, or the like.

Then, in step S16, the gesture operation of the hand of the user on the side face detected in the step is associated with the application program, to determine the operation instruction. The operation instruction includes an operated object and to-be-executed content.

In some embodiments, if it is detected that the current interface is the system desktop interface or the e-book reading interface, and a sliding operation of the hand of the user in the first direction on the side face is detected, the sliding operation may be identified as an instruction of performing scrolling on the system desktop interface or performing page turning on the e-book reading interface.

In some embodiments, if it is detected that the current interface is the conversation interface or the music playback interface, and a sliding operation of the hand of the user in the second direction on the side face is detected, the sliding operation may be identified as an instruction of adjusting volume.

In some embodiments, if it is detected that the current interface is the short messaging service message interface or the e-book reading interface, and a sliding operation of the hand of the user in the second direction on the side face is detected, the sliding operation may be identified as an instruction of displaying a short messaging service message list in a movement manner or displaying an e-book in a movement manner.

In some embodiments, if it is detected that the current interface is the music playback interface or the sound recording interface, and a tap operation of the hand of the user on the side face is detected, the tap operation may be identified as an instruction of pausing/continuing playback of music or sound recording.

In some embodiments, to distinguish between random sliding when a user normally holds the mobile terminal and has no operation intention and a gesture operation when a user has an operation intention, a preset gesture enabling operation (a wakeup gesture) for a gesture operation on the side face may be preset. Specifically, in step S16: The first gesture enabling operation is detected. The first gesture enabling operation includes the preset gesture enabling operation of the hand of the user on the side face. In response to detecting the first gesture enabling operation, the association identification for associating the gesture operation with the application program is enabled. In response to detecting the gesture operation of the hand of the user on the side face, the gesture operation is associated with the application program, and the operation instruction is determined. For example, it is set that sliding from the front face to the back face and then back to the front face is a wakeup gesture. After the wakeup gesture is performed, the association identification is enabled, and the detected gesture operation of the hand of the user on the side face is associated with the application program.

In some embodiments, step S16 further includes: after the association identification is enabled, disabling the association identification if no gesture operation of the hand of the user on the side face is detected within a preset time period. After the association identification is enabled, the detected gesture operation of the hand of the user on the side face is associated with the application program within a particular time period. After the gesture operation has been stopped for a preset period of time (for example, five seconds), it can be considered that a gesture operation procedure ends, and the association identification is disabled. If the association between the gesture operation on the side face and the application program is to be continued, the gesture operation needs to be woken up again.

In some embodiments, in the method, for a system or different applications, when different operation meanings (such as volume up/down, song switching, and page turning of an e-book) are assigned to different motions of a gesture operation, a current application program of the system or the different application is detected, and the gesture operation is associated with the application program. After the association is implemented, a correct gesture operation plays a part and generates a corresponding operation instruction. The mobile terminal executes the gesture operation instruction.

In the operation detection method, when the hand of the user holds the mobile terminal, contact positions of a palm and fingers can be further determined based on the capacitance signal on the first capacitive touch display screen and the capacitance signal on the second capacitive touch display screen, so as to determine a holding hand and a holding gesture.

Specifically, the method includes step S18, in step S18, gesture pattern identification is performed on a combination of the first region and the second region, to determine a holding posture of the hand of the user. In some embodiments, the holding posture of the hand of the user includes the left hand or the right hand for holding, and contact positions of a palm and fingers on the mobile terminal.

In some embodiments, a process of the gesture pattern identification may be: performing pattern comparison with some preset gesture patterns based on the first region and the second region; and when pattern comparison with any preset gesture pattern meets a comparison condition, determining, based on the preset gesture pattern, the holding posture of the hand of the user, the left hand or the right hand for holding, and contact positions of a palm and fingers on the mobile terminal.

In some embodiments, when the contact positions of the fingers on the mobile terminal are determined, a contact position of the thumb on the side face and contact positions of one or more of the other four fingers on the other side face may be separately determined.

In some embodiments, when the contact position of the thumb is determined, a gesture operation of the thumb is determined as a valid gesture operation, and any pair of area changes, capacitance signal strength changes, and position changes of the third region and the fourth region that are close to the contact position of the thumb are dynamically detected. Determining a dynamic change of the thumb in a contact region on the side face and determining the valid gesture operation can avoid interference of an unintended contact in the operation detection.

In some embodiments, when the contact position of the thumb on one side face and the contact positions of the one or more of the other four fingers on the other side face are determined, a gesture operation of the thumb and the contact positions of the one or more of the other four fingers on the other side face are determined as valid gesture operations, and any pair of area changes, capacitance signal strength changes, and position changes of the third region and the fourth region that are close to the contact positions of the thumb and the one or more of the other four fingers are dynamically detected. Determining a dynamic change in the contact region on the side face and determining a valid multipoint gesture operation not only avoid interference of an unintended contact in the operation detection but also can identify the multipoint gesture operation, thereby improving gesture diversity and flexibility.

In some embodiments, the method further includes step S19 (not shown) and step S20 (not shown). When it is determined that the palm approaches one surface (the front face or the back face) of the mobile terminal, one opposite surface may be determined as a display screen currently being viewed by the user, and the determined display screen being viewed by the user may be selected to display information. In some embodiments, the display screen on the surface that is of the mobile terminal and that is approached by the palm may automatically switch off, so as to reduce power consumption.

Figure 15:
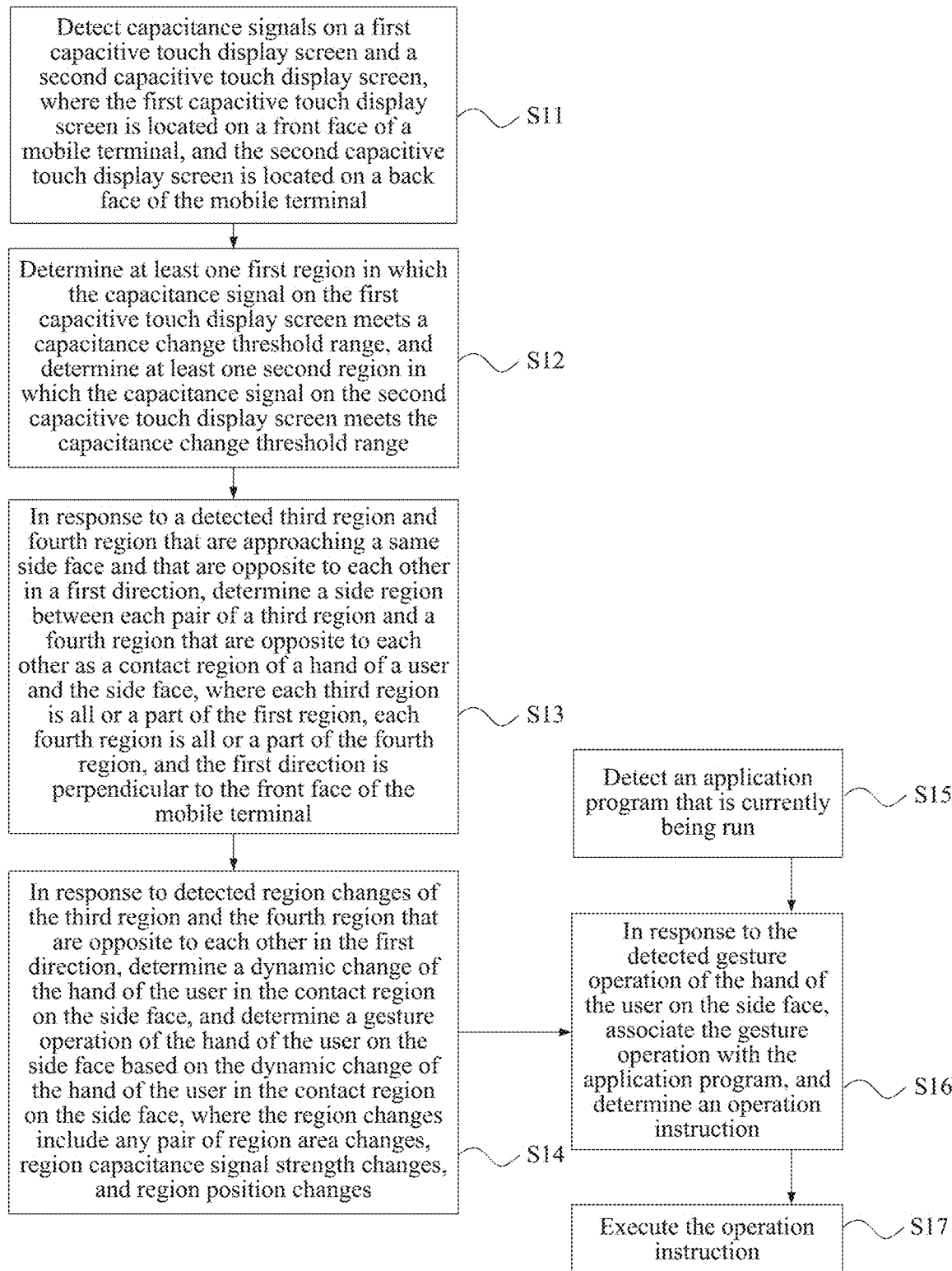
FIG. 15 is a schematic flowchart of an operation detection method according to some embodiments.
Figure 16:
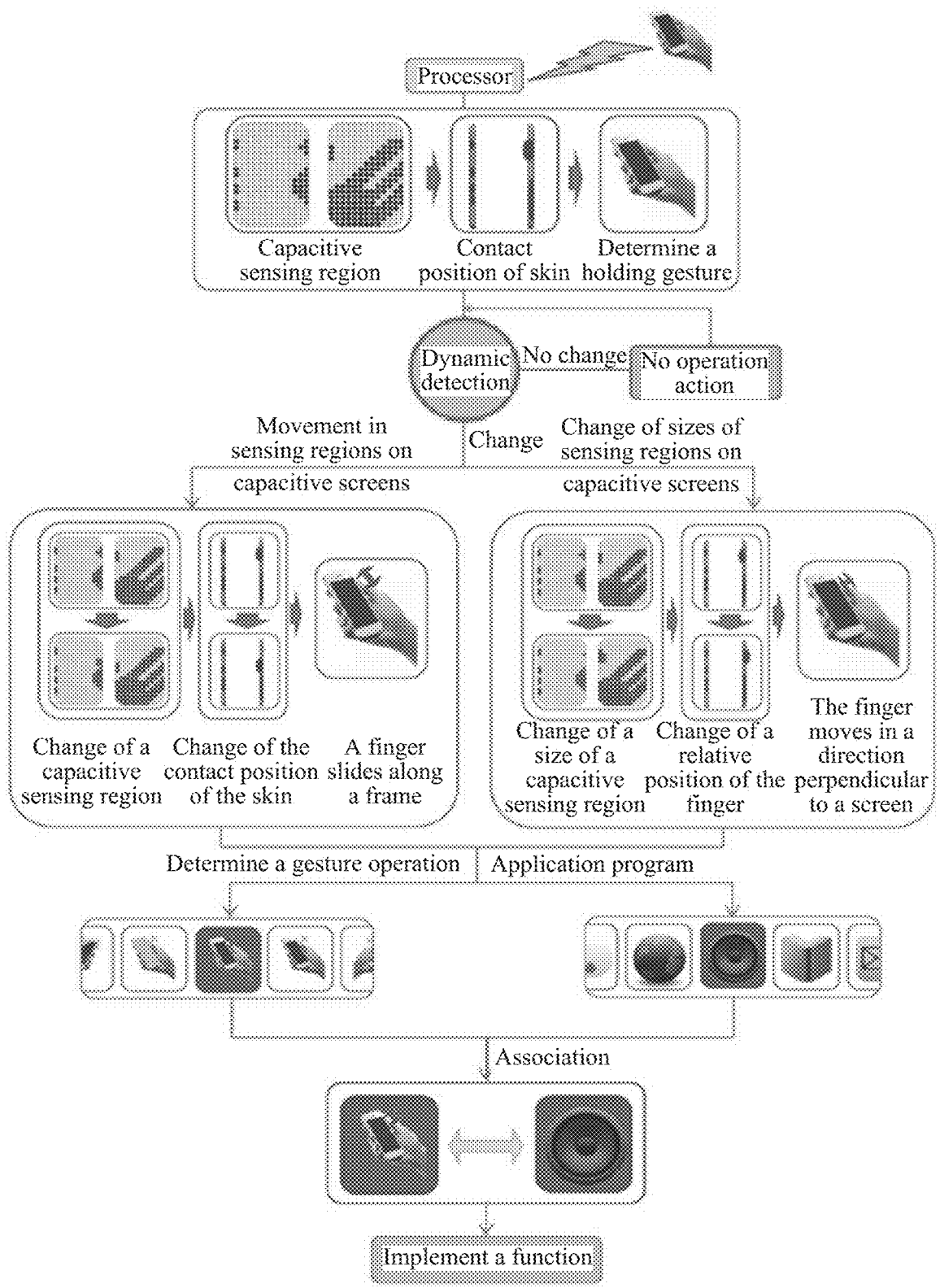
FIG. 16 is a schematic flowchart of an operation detection method in a scenario according to some embodiments.

With reference to FIG. 15 and FIG. 16, FIG. 15 and FIG. 16 are schematic flowcharts of the operation detection method implemented on the mobile phone. When the hand of the user holds the mobile phone, the processor controls capacitive sensing regions on the first capacitive touch display screen and the second capacitive touch display screen to perform sensing, so as to determine the first region and the second region that meet the capacitance change threshold range. The processor performs gesture pattern identification on the first region and the second region to determine a contact position of skin of the hand of the user on the side face and determine the holding gesture; and then, dynamically detects whether the contact position of the hand of the user on the side face changes, and performs no operation action if there is no change, or determines movement of the contact position in the sensing regions in the capacitive touch display screens (that is, capacitive screens) if there is a change. When the capacitive sensing regions change, it is determined that the contact position of the hand of the user moves up and down along the side face, thereby determining that the hand of the user slides up and down on the side face (that is, a frame). When sizes of the capacitive sensing regions change, it is determined that a relative position of the skin on the side face changes, that is, the contact position moves back and forth, thereby determining that the hand of the user slides back and forth in a direction perpendicular to the screen (the first capacitive touch display screen). When a gesture operation of the hand of the user on the side frame is determined, a current application program is detected. For example, if it is detected that a current application program is a music playback application, and the hand of the user slides up and down on the side frame, the two are associated, to determine an operation instruction of adjusting volume. In this case, the operation instruction is executed, to adjust volume of currently played music, thereby implementing a corresponding function.

Figure 17:
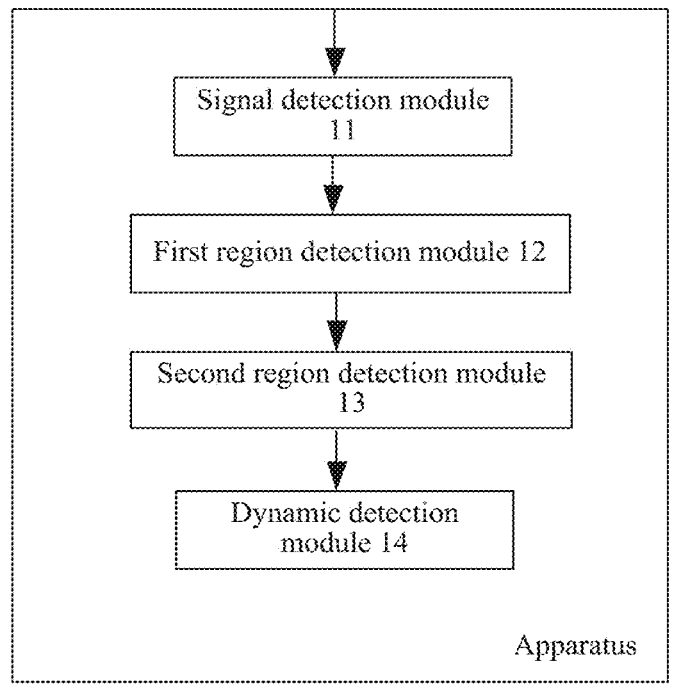
FIG. 17 is a schematic structural block diagram of an operation detection apparatus according to some embodiments.

FIG. 17 shows an operation detection apparatus according to some embodiments. The apparatus includes a signal detection module 11, a first region detection module 12, a second region detection module 13, and a dynamic detection module 14.

The signal detection module 11 detects capacitance signals on a first capacitive touch display screen and a second capacitive touch display screen. The first capacitive touch display screen is located on a front face of the mobile terminal, and the second capacitive touch display screen is located on a back face of the mobile terminal. The first region detection module 12 determines at least one first region in which the capacitance signal on the first capacitive touch display screen meets a capacitance change threshold range, and determines at least one second region in which the capacitance signal on the second capacitive touch display screen meets the capacitance change threshold range. In response to detecting a third region and fourth region that are approaching a same side face and that are opposite to each other in a first direction, the second region detection module 13 determines a side region between each pair of a third region and a fourth region that are opposite to each other as a contact region of a hand of a user and the side face. Each third region is all or a part of the first region, each fourth region is all or a part of the fourth region, and the first direction is perpendicular to the front face of the mobile terminal. In response to detecting region changes of the third region and the fourth region that are opposite to each other in the first direction, the dynamic detection module 14 determines a dynamic change of the hand of the user in the contact region on the side face, and determines a gesture operation of the hand of the user on the side face based on the dynamic change of the hand of the user in the contact region on the side face. The region changes include any pair of region area changes, region capacitance signal strength changes, and region position changes.

In some embodiments, the second region detection module 13 includes a first contact region detection subunit. In response to detecting that a relative area of the third region and the fourth region that are opposite to each other in the first direction meets a preset area threshold or that an area ratio meets a preset area ratio threshold, the first contact region detection subunit determines the side region between the third region and the fourth region as the contact region of the hand of the user and the side face.

In some embodiments, the second region detection module 13 further includes: a first position detection subunit, configured to determine, based on relative positions of the third region and the fourth region that are opposite to each other in the first direction, that a center of a contact position of the hand of the user on the side face is at a first position in a second direction on the side face; and a second position detection subunit, configured to determine, based on an area relationship between the third region and the fourth region that are opposite to each other in the first direction, that the center of the contact position of the hand of the user on the side face is at a second position in the first direction on the side face. Correspondingly, the dynamic detection module further includes a first dynamic detection subunit, configured to: in response to detecting position changes of the first position and the second position on the side face over time, determine the gesture operation of the hand of the user on the side face.

In some embodiments, the dynamic detection module 14 includes a first movement determining subunit and a first operation determining subunit. In response to detecting that for the third region and the fourth region that are opposite to each other in the first direction, a region area of the third region gradually increases and a region area of the fourth region gradually decreases over time, or a region area of the third region gradually decreases and a region area of the fourth region gradually increases over time, the first movement determining subunit determines movement of the hand of the user in the first direction in the contact region on the side face. The first operation determining subunit determines a sliding operation of the hand of the user in the first direction on the side face based on the movement of the hand of the user in the first direction in the contact region on the side face.

In some embodiments, the dynamic detection module 14 includes a second movement determining subunit and a second operation determining subunit. In response to detecting that for the third region and the fourth region that are opposite to each other in the first direction, a region capacitance signal in the third region gradually increases and a region capacitance signal in the fourth region gradually decreases over time, or a region capacitance signal in the third region gradually decreases and a region capacitance signal in the fourth region gradually increases over time, the second movement determining subunit determines movement of the hand of the user in the first direction in the contact region on the side face. The second operation determining subunit determines a sliding operation of the hand of the user in the first direction on the side face based on the movement of the hand of the user in the first direction in the contact region on the side face.

In some embodiments, the dynamic detection module 14 includes a third movement determining subunit and a third operation determining subunit. In response to detecting a relative position movement, in a second direction over time, of the third region and the fourth region that are opposite to each other in the first direction, the third movement determining subunit determines movement of the hand of the user in the second direction in the contact region on the side face. The second direction is parallel to the front face and the side face of the mobile terminal. The third operation determining subunit determines a sliding operation of the hand of the user in the second direction on the side face based on the movement of the hand of the user in the second direction in the contact region on the side face.

In some embodiments, the dynamic detection module 14 includes a fourth movement determining subunit and a fourth operation determining subunit. In response to detecting that the third region and the fourth region that are opposite to each other in the first direction appear and then simultaneously disappear within a first time threshold, the fourth movement determining subunit determines that the hand of the user comes into contact with and then leaves the contact region on the side face within the first time threshold. The fourth operation determining subunit is configured to determine a tap operation of the hand of the user on the side face based on that the hand of the user comes into contact with and then leaves the contact region on the side face within the first time threshold.

In some embodiments, the second region detection module 13 includes a second contact region detection subunit and a second dynamic detection subunit. The second contact region detection subunit determines a plurality of side regions as a plurality of contact regions of the hand of the user and the side face. The dynamic detection module includes a second dynamic detection subunit. In response to detecting dynamic changes of the hand of the user in the plurality of contact regions on the side face, the second dynamic detection subunit determines a multipoint gesture operation of the hand of the user on the side face.

For content of functions implemented by the signal detection module 11 and the subunits included by the signal detection module 11, refer to content described in step S11 in the method in the foregoing embodiments. For content of functions implemented by the first region detection module 12 and the subunits included by the first region detection module 12, refer to content described in step S12 in the method in the foregoing embodiments. For content of functions implemented by the second region detection module 13 and the subunits included by the second region detection module 13, refer to content described in step S13 in the method in the foregoing embodiments. For content of functions implemented by the dynamic detection module 14 and the subunits included by the dynamic detection module 14, refer to content described in step S14 in the method in the foregoing embodiments. Details are not described again, and are incorporated herein by reference.

FIG. 17 is a structural block diagram of an example of an apparatus according to some embodiments. Based on FIG. 16, the apparatus further includes a data detection module 15, an instruction detection module 16, and an execution module 17. The data detection module 15 detects an application program that is currently being run. In response to detecting the gesture operation of the hand of the user on the side face, the instruction detection module 16 associates the gesture operation with the application program, and determines an operation instruction. The execution module 17 executes the operation instruction.

In some embodiments, the instruction detection module 16 includes a gesture detection subunit and an instruction detection subunit. The gesture detection subunit detects a first gesture enabling operation. The first gesture enabling operation includes a preset gesture enabling operation of the hand of the user on the side face. In response to detecting the first gesture enabling operation, the instruction detection subunit enables association identification for associating the gesture operation with the application program, and in response to detecting the gesture operation of the hand of the user on the side face, associates the gesture operation with the application program, and determines the operation instruction.

In some embodiments, the instruction detection module 16 further includes a disabling subunit. After the association identification is enabled, the disabling subunit disables the association identification if no gesture operation of the hand of the user on the side face is detected within a preset time period.

For content of functions implemented by the data detection module 15 and the subunits included by the data detection module 15, refer to content described in step S15 in the method in the foregoing embodiments. For content of functions implemented by the instruction detection module 16 and the subunits included by the instruction detection module 16, refer to content described in step S16 in the method in the foregoing embodiments. For content of functions implemented by the execution module 17 and the subunits included by the execution module 17, refer to content described in step S17 in the method in the foregoing embodiments. Details are not described again, and are incorporated herein by reference.

Figure 18:
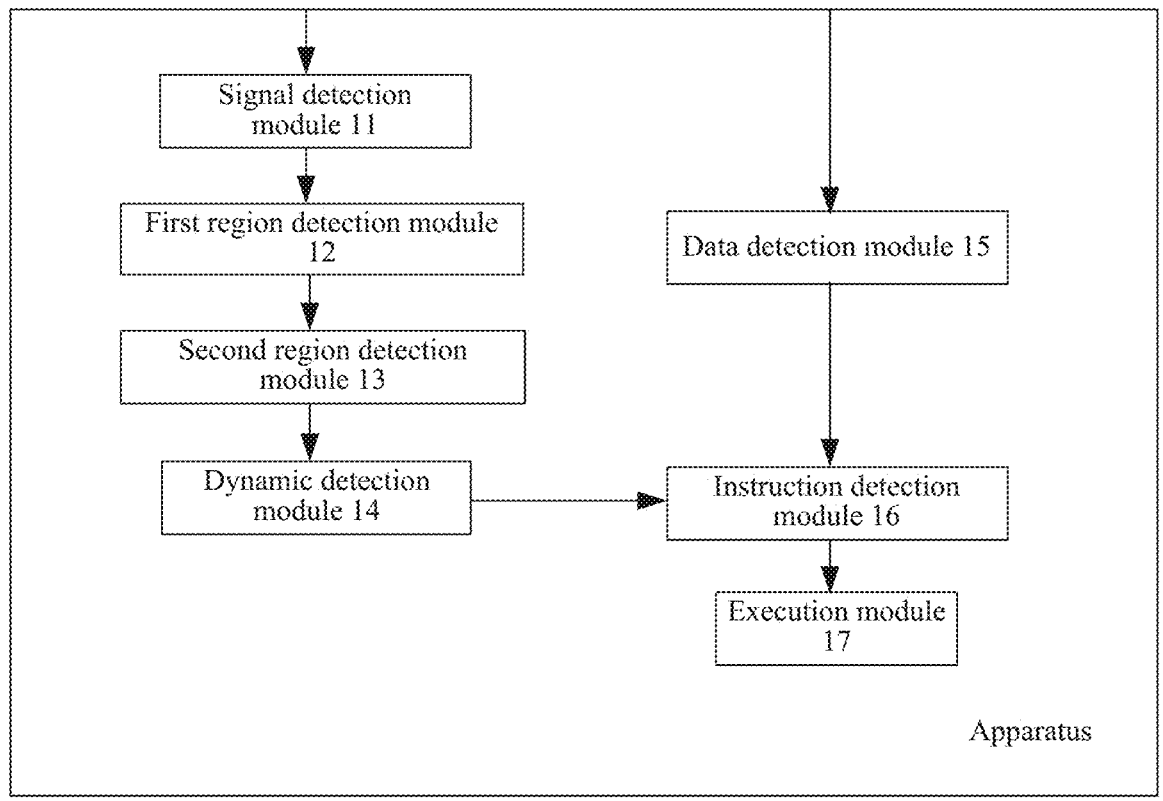
FIG. 18 is a schematic structural block diagram of an operation detection apparatus according to some embodiments.

FIG. 18 is a schematic structural block diagram of an operation detection apparatus according to some embodiments. Based on the embodiment in FIG. 17, the apparatus further includes a posture detection module 18. The posture detection module 18 performs gesture pattern identification on a combination of the first region and the second region, to determine a holding posture of the hand of the user. The holding posture of the hand of the user includes the left hand or the right hand for holding, and contact positions of a palm and fingers on the mobile terminal.

In some embodiments, the apparatus further includes a display screen detection module (not shown) and a display module (not shown). The display screen detection module determines, based on the holding posture of the hand of the user, a display screen currently being viewed by the user. The display screen is the first capacitive touch display screen or the second capacitive display screen. The display module displays information on the display screen being viewed by the user.

For content of functions implemented by the posture detection module 18 and the subunits included by the posture detection module 18, refer to content described in step S18 in the method in the foregoing embodiments. For content of functions implemented by the display screen detection module and the display module, refer to content described in step S19 and step S20 respectively. Details are not described again, and are incorporated herein by reference.

What is claimed is:

1. An operation detection method for a mobile terminal, comprising:
    detecting a first capacitance signal on a first capacitive touch display screen and a second capacitance signal on a second capacitive touch display screen, wherein the first capacitive touch display screen is located on a front face of the mobile terminal, and wherein the second capacitive touch display screen is located on a back face of the mobile terminal;
    determining at least one first region in which the first capacitance signal meets a capacitance change threshold range;
    determining at least one second region in which the second capacitance signal meets the capacitance change threshold range;
    detecting a third region and a fourth region approaching a side face and opposite to each other in a first direction;
    determining a side region between each pair of the third region and the fourth region as a contact region of a hand of a user and the side face in response to detecting the third region and the fourth region, wherein each third region is all or a part of the at least one first region, wherein each fourth region is all or a part of the at least one second region, and wherein the first direction is perpendicular to the front face of the mobile terminal;
    detecting region changes of the third region and the fourth region, wherein the region changes comprise a pair of region area changes, region capacitance signal strength changes, or region position changes;
    determining a dynamic change of the hand of the user in the contact region on the side face in response to detecting the region changes; and
    identifying a gesture operation of the hand of the user on the side face based on the dynamic change.

2. The operation detection method of claim 1, wherein determining the contact region comprises:
    detecting that a relative area of the third region and the fourth region meets a preset area threshold or that an area ratio meets a preset area ratio threshold; and
    determining the side region between the third region and the fourth region as the contact region.

3. The operation detection method of claim 1, wherein determining the contact region comprises:

determining, based on relative positions of the third region and the fourth region, that a center of a contact position of the hand of the user on the side face is at a first position in a second direction on the side face; and determining, based on an area relationship between the third region and the fourth region, that the center of the contact position is at a second position in the first direction on the side face, wherein identifying the gesture operation comprises:
  detecting position changes of the first position and the second position on the side face over time; and
  identifying the gesture operation of the hand of the user on the side face based on detecting the position changes of the first position and the second position on the side face over time.

4. The operation detection method of claim 1, wherein identifying the gesture operation comprises:
  detecting that for the third region and the fourth region, a region area of the third region gradually increases and a region area of the fourth region gradually decreases over time or the region area of the third region gradually decreases and the region area of the fourth region gradually increases over time;
  determining movement of the hand of the user in the first direction in the contact region on the side face; and
  identifying a sliding operation of the hand of the user in the first direction on the side face based on the movement of the hand of the user.

5. The operation detection method of claim 1, wherein identifying the gesture operation comprises:
  detecting that for the third region and the fourth region, a region capacitance signal strength in the third region gradually increases and a region capacitance signal strength in the fourth region gradually decreases over time or the region capacitance signal strength in the third region gradually decreases and the region capacitance signal strength in the fourth region gradually increases over time;
  determining movement of the hand of the user in the first direction in the contact region on the side face; and
  identifying a sliding operation of the hand of the user in the first direction on the side face based on the movement of the hand of the user.

6. The operation detection method of claim 1, wherein identifying the gesture operation comprises:
  detecting a relative position movement, in a second direction over time, of the third region and the fourth region;
  determining movement of the hand of the user in the second direction in the contact region on the side face, wherein the second direction is parallel to the front face and the side face of the mobile terminal; and
  identifying a sliding operation of the hand of the user in the second direction on the side face based on the movement of the hand of the user.

7. The operation detection method of claim 1, wherein identifying the gesture operation comprises:
  detecting that the third region and the fourth region appear and then simultaneously disappear within a first time threshold;
  determining that the hand of the user couples and decouples with the contact region on the side face within the first time threshold; and
  identifying a tap operation of the hand of the user on the side face based on determining that the hand of the user couples and decouples with the contact region on the side face within the first time threshold.

8. The operation detection method of claim 1 wherein determining the contact region comprises determining a plurality of side regions as a plurality of contact regions of the hand of the user and the side face, and wherein identifying the gesture operation comprises:
  detecting dynamic changes of the hand of the user in the contact regions on the side face; and
  identifying a multipoint gesture operation of the hand of the user on the side face.

9. The operation detection method of claim 1, further comprising detecting an application program currently being run, and wherein after identifying the gesture operation, the operation detection method further comprises:
  associating the gesture operation with the application program;
  determining an operation instruction; and
  executing the operation instruction.

10. The operation detection method of claim 9, wherein determining the operation instruction comprises:
  detecting a first gesture enabling operation, wherein the first gesture enabling operation comprises a preset gesture enabling operation of the hand of the user on the side face;
  enabling association identification for associating the gesture operation with the application program in response to detecting the first gesture enabling operation; and
  associating the gesture operation with the application program, and determining the operation instruction after identifying the gesture operation of the hand of the user.

11. The operation detection method of claim 10, wherein after enabling the association identification, the operation detection method further comprises disabling the association identification in response to not identifying the gesture operation of the hand of the user on the side face within a preset time period.

12. The operation detection method of claim 1, further comprising:
  performing gesture pattern identification on a combination of the first region and the second region; and
  determining a holding posture of the hand of the user.

13. The operation detection method of claim 12, wherein the holding posture comprises a left hand or a right hand for holding and contact positions of a palm and fingers on the mobile terminal.

14. The operation detection method of claim 13, further comprising:
  determining, according to the holding posture, a display screen currently being viewed by the user, wherein the display screen is the first capacitive touch display screen or the second capacitive touch display screen; and
  displaying information on the display screen currently being viewed by the user.

15. The operation detection method of claim 1, wherein the contact region comprises:
  a contact touch region of the hand of the user and the side face; or
  a floating touch region of the hand of the user and the side face.

16. A mobile terminal, comprising:
  a touch display;
  a memory configured to store a computer program; and
  a processor coupled to the touch display and the memory, wherein the computer program causes the processor to be configured to:

detect a first capacitance signal on a first capacitive touch display screen and a second capacitance signal on a second capacitive touch display screen, wherein the first capacitive touch display screen is located on a front face of the mobile terminal, and wherein the second capacitive touch display screen is located on a back face of the mobile terminal;

determine at least one first region in which the first capacitance signal meets a capacitance change threshold range;

determine at least one second region in which the second capacitance signal meets the capacitance change threshold range;

detect a third region and a fourth region approaching a side face and opposite to each other in a first direction;

determine a side region between each pair of the third region and the fourth region as a contact region of a hand of a user and the side face in response to detecting the third region and the fourth region, wherein each third region is all or a part of the first region, wherein each fourth region is all or a part of the second region, and wherein the first direction is perpendicular to the front face of the mobile terminal;

detect region changes of the third region and the fourth region, wherein the region changes comprise a pair of region area changes, region capacitance signal strength changes, or region position changes; and determine a dynamic change of the hand of the user in the contact region on the side face in response to detecting the region changes of the third region and the fourth region; and identify a gesture operation of the hand of the user on the side face based on the dynamic change of the hand.

17. The mobile terminal of claim 16, wherein the computer program further causes the processor to be configured to:

detect that a relative area of the third region and the fourth region meets a preset area threshold or that an area ratio meets a preset area ratio threshold; and determine the side region between the third region and the fourth region as the contact region of the hand of the user and the side face.

18. The mobile terminal of claim 17, wherein the computer program further causes the processor to be configured to:

detect that for the third region and the fourth region, a region area of the third region gradually increases and a region area of the fourth region gradually decreases over time or the region area of the third region gradually decreases and the region area of the fourth region gradually increases over time;

determine movement of the hand of the user in the first direction in the contact region on the side face; and identify a sliding operation of the hand of the user in the first direction on the side face based on the movement of the hand of the user.

19. The mobile terminal of claim 17, wherein the computer program further causes the processor to be configured to:

detect that for the third region and the fourth region, a region capacitance signal strength in the third region gradually increases and a region capacitance signal strength in the fourth region gradually decreases over time or the region capacitance signal strength in the third region gradually decreases and the region capacitance signal strength in the fourth region gradually increases over time;

determine movement of the hand of the user in the first direction in the contact region on the side face; and identify a sliding operation of the hand of the user in the first direction on the side face based on the movement of the hand of the user.

20. The mobile terminal of claim 16, wherein the computer program further causes the processor to be configured to:

determine, based on relative positions of the third region and the fourth region, that a center of a contact position of the hand of the user on the side face is at a first position in a second direction on the side face;

determine, based on an area relationship between the third region and the fourth region, that the center of the contact position is at a second position in the first direction on the side face;

detect position changes of the first position and the second position on the side face over time; and identify the gesture operation of the hand of the user on the side face.

* * * * *